(12) United States Patent
Matsui et al.

(10) Patent No.: US 11,169,790 B2
(45) Date of Patent: Nov. 9, 2021

(54) SOFTWARE MANAGEMENT DEVICE, SOFTWARE MANAGEMENT SYSTEM, AND NON-TRANSITORY COMPUTER READABLE MEDIUM STORING PROGRAM

(71) Applicant: FUJIFILM Business Innovation Corp., Tokyo (JP)

(72) Inventors: Haruki Matsui, Kanagawa (JP); Koji Hashimoto, Kanagawa (JP); Toru Nakatani, Kanagawa (JP); Takeshi Ogura, Kanagawa (JP); Aiko Nozue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 153 days.

(21) Appl. No.: 16/154,743

(22) Filed: Oct. 9, 2018

(65) Prior Publication Data

US 2019/0121629 A1 Apr. 25, 2019

(30) Foreign Application Priority Data

Oct. 20, 2017 (JP) .............................. JP2017-203446

(51) Int. Cl.
*G06F 9/445* (2018.01)
*H04L 29/08* (2006.01)
(Continued)

(52) U.S. Cl.
CPC .............. *G06F 8/61* (2013.01); *G06F 3/1204* (2013.01); *G06F 3/1225* (2013.01); *G06F 8/65* (2013.01)

(58) Field of Classification Search
CPC ...... G06F 8/61; G06F 8/65; G06F 8/60; G06F 8/63; G06F 8/71; G06F 21/57;
(Continued)

(56) References Cited

U.S. PATENT DOCUMENTS

2003/0051069 A1\* 3/2003 Iida ....................... G06F 9/4411
719/321
2007/0234352 A1\* 10/2007 Esders ..................... G06F 8/61
717/175
(Continued)

FOREIGN PATENT DOCUMENTS

JP 2001356912 12/2001
JP 2006065388 3/2006
(Continued)

OTHER PUBLICATIONS

Sun et al., Quantifying Failure Risk of Version Switch for Rolling Upgrade on Cloud, 8 pages (Year: 2014).\*
(Continued)

*Primary Examiner* — Thuy Dao
(74) *Attorney, Agent, or Firm* — JCIPRNET

(57) ABSTRACT

A software management device includes a specification section that specifies a to-be-replaced software product which is a software product having been installed in a device in advance and which is replaced with a target software product, prior to remote installation of the target software product in the device, and a providing section that provides notice information including replacement notice information for giving a notice of the replacement of the to-be-replaced software product with the target software product to a user who attempts to execute the remote installation, prior to the remote installation.

14 Claims, 26 Drawing Sheets

(51) Int. Cl.
*G06F 8/65* (2018.01)
*G06F 9/50* (2006.01)
*G06F 9/44* (2018.01)
*G06F 8/61* (2018.01)
*G06F 3/12* (2006.01)

(58) Field of Classification Search
CPC .. G06F 9/44505; G06F 11/0796; H04L 67/34; H04L 67/02; H04L 67/10
See application file for complete search history.

(56) References Cited

U.S. PATENT DOCUMENTS

| | | | | |
|---|---|---|---|---|
| 2009/0007097 | A1* | 1/2009 | Hinton | G06F 8/61 717/176 |
| 2010/0037217 | A1* | 2/2010 | Takatsu | G06F 8/65 717/174 |
| 2013/0067463 | A1 | 3/2013 | Ito | |
| 2013/0263113 | A1* | 10/2013 | Cavazza | G06F 8/61 717/178 |
| 2014/0245278 | A1* | 8/2014 | Zellen | G06F 8/65 717/170 |
| 2015/0186125 | A1* | 7/2015 | Avery | G06F 9/44578 717/174 |
| 2015/0261518 | A1* | 9/2015 | Viswanathan | G06F 8/71 717/168 |

FOREIGN PATENT DOCUMENTS

| | | |
|---|---|---|
| JP | 2007122128 | 5/2007 |
| JP | 2011170639 | 9/2011 |
| JP | 2011253417 | 12/2011 |
| JP | 2014006587 | 1/2014 |
| JP | 5991740 | 9/2016 |

OTHER PUBLICATIONS

"Office Action of Japan Counterpart Application" with English translation thereof, dated Aug. 31, 2021, p. 1-p. 6.

* cited by examiner

FIG. 4

| USER ID | USER NAME | ... | ACQUIRED PRODUCT ID | LICENSE KEY | IN USE | ... |
|---|---|---|---|---|---|---|
| **** | **** | | ********* | ********** | Y | |
| | | | | ********** | Y | |
| | | | | ********** | Y | |
| | | | | ********** | N | |
| | | | | ********** | N | |
| **** | **** | | ********* | | | |
| **** | **** | | ********* | ********** | Y | |
| ... | | | | | | |

| | | PRODUCT ID | PRODUCT A | PRODUCT B | ... |
|---|---|---|---|---|---|
| PRODUCT BASIC INFORMATION | | PRODUCT VERSION | 1.0 | 1.0 | |
| | | PRODUCT NAME | ***** | **** | |
| | 116 | YEAR MONTH AND DAY OF RELEASE | 3/1/2017 | 3/3/2017 | |
| | | TARGET DEVICE TYPE | 1.1.21.1<br>1.1.21.2<br>... | 1.1.21.1<br>1.1.21.2<br>1.1.21.3<br>... | |
| | | INSTALLER URL | ******** | ******* | |
| | | ... | | | |
| PRODUCT CONFIGURATION INFORMATION | | MODULE ID/ VERSION/ TARGET DEVICE TYPE/ RELATION INFORMATION/... | (1)Module_A/<br>1.0/<br>1.1.21.1,<br>1.1.21.2,.../<br>or<br>(2)Module_AA/<br>1.0/<br>1.1.21.1,<br>1.1.21.3,.../ | (2)Module_A/<br>1.0/<br>1.1.21.1,<br>1.1.21.2,.../<br>and<br>(2)Module_BB/<br>1.0/<br>1.1.21.1,<br>1.1.21.2,.../ 117 | |
| | | ... | | | |

112 — PRODUCT BASIC INFORMATION
116
114 — PRODUCT CONFIGURATION INFORMATION

FIG. 7

| CONTROL CODE | INSTALLATION CONTROL | DISPLAY CONTROL |
|---|---|---|
| C1 | CLEAN INSTALLATION | NOTICE OF DELETION OF TO-BE-REPLACED PRODUCT NOTICE OF DELETION OF SETTING INFORMATION |
| C2 | OVERWRITE INSTALLATION | NOTICE OF DELETION OF TO-BE-REPLACED PRODUCT NOTICE OF SUCCESSION OF SETTING INFORMATION |
| C3 | INSTALLATION PROHIBITION | NOTICE OF IMPOSSIBILITY OF INSTALLATION |

118

| TARGET PRODUCT | PRODUCT NAME | INSTALLED PRODUCT CONTROL CODE |
|---|---|---|
| XXX-A | CLOUD ASSOCIATION EXPERIENCE VERSION | XXX-B:C3 |
| XXX-B | CLOUD ASSOCIATION | XXX-A:C1 |
| YYY-A | PAPERLESS SETTING | YYY-B:C3 |
| YYY-B | PAPERLESS SHARING | YYY-A:C2 |
| ZZZ-A | SCAN DATA STORAGE | ZZZ-B:C3 |
| ZZZ-B | PACKAGE OF COPYING, SCANNING, AND PRINTING | ZZZ-A:C1 |
| WWW-A | HISTORY OUTPUT | WWW-B:C3 |
| WWW-B | LOG MANAGEMENT | WWW-A:C2 |
| ... | ... | |

FIG. 17

| THIS PRODUCT (TARGET PRODUCT OR INSTALLED PRODUCT) | PRODUCT NAME | CONTROL CODE CORRESPONDING PRODUCT (TO-BE-REPLACED PRODUCT) | CONTROL CODE CORRESPONDING PRODUCT (TARGET PRODUCT) |
|---|---|---|---|
| XXX-A | CLOUD ASSOCIATION EXPERIENCE VERSION | | |
| XXX-B | CLOUD ASSOCIATION | D1:XXX-A | D3:XXX-A |
| YYY-A | PAPERLESS SETTING | | |
| YYY-B | PAPERLESS SHARING | D2:YYY-A | D3:YYY-A |
| ZZZ-A | SCAN DATA STORAGE | | |
| ZZZ-B | PACKAGE OF COPYING, SCANNING, AND PRINTING | D1:ZZZ-A | D3:ZZZ-A |
| WWW-A | HISTORY OUTPUT | | |
| WWW-B | LOG MANAGEMENT | D2:WWW-A | D3:WWW-A |
| ... | ... | ... | ... |

| REPLACEMENT TYPE | CONTENTS |
|---|---|
| T1 | EXPERIENCE VERSION → PRODUCT VERSION |
| T2 | FREE VERSION → UPGRADE VERSION (PAY VERSION) |
| T3 | INDIVIDUAL PRODUCT → PACKAGE PRODUCT |
| T4 | PROVISION-TERMINATED PRODUCT → SUBSEQUENT PRODUCT |
| ... | ... |

| TARGET PRODUCT | PRODUCT NAME | TO-BE-REPLACED PRODUCT | REPLACEMENT TYPE | CONTROL CODE |
|---|---|---|---|---|
| XXX-A | CLOUD ASSOCIATION EXPERIENCE VERSION | | | |
| XXX-B | CLOUD ASSOCIATION | XXX-A | T1 | C1 |
| YYY-A | PAPERLESS SETTING | | | |
| YYY-B | PAPERLESS SHARING | YYY-A | T2 | C2 |
| ZZZ-A | SCAN DATA STORAGE | | | |
| ZZZ-B | PACKAGE OF COPYING, SCANNING, AND PRINTING | ZZZ-A | T3 | C1 |
| WWW-A | HISTORY OUTPUT | | | |
| WWW-B | LOG MANAGEMENT | WWW-A | T4 | C2 |
| ... | ... | ... | ... | ... |

| REPLACEMENT TYPE | C1: DISPLAY CONTENTS | C2: DISPLAY CONTENTS |
|---|---|---|
| T1 (EXPERIENCE VERSION → PRODUCT VERSION) | "B" WHICH IS PRODUCT VERSION OF "A" IS INSTALLED. MEANWHILE, SETTING INFORMATION OF "A" IS NOT TAKEN OVER. | "B" WHICH IS PRODUCT VERSION OF "A" IS INSTALLED. EXISTING SETTING INFORMATION OF "A" IS HELD. |
| T2 (FREE VERSION → UPGRADE VERSION) | IN A CASE WHERE "B" IS INSTALLED, "A" IS DELETED. MEANWHILE, SETTING INFORMATION OF "A" IS NOT TAKEN OVER. | IN A CASE WHERE "B" IS INSTALLED, "A" IS DELETED. EXISTING SETTING INFORMATION OF "A" IS HELD. |
| T3 (INDIVIDUAL PRODUCT → PACKAGE PRODUCT) | IN A CASE WHERE "B" IS NOT DISPLAYED. MEANWHILE, SETTING INFORMATION OF "A" IS NOT TAKEN OVER. | IN A CASE WHERE "B" IS INSTALLED, "A" IS NOT DISPLAYED. |
| T4 (PROVISION-TERMINATED PRODUCT → SUBSEQUENT PRODUCT) | A IS DELETED, AND SUBSEQUENT PRODUCT B IS INSTALLED. MEANWHILE, SETTING INFORMATION OF "A" IS NOT TAKEN OVER. | "A" IS DELETED, AND "B" WHICH IS SUBSEQUENT PRODUCT IS INSTALLED. EXISTING SETTING INFORMATION OF "A" IS HELD. |
| ⋮ | ⋮ | ⋮ |

FIG. 23

| CASE | INSTALLED PRODUCT | TARGET PRODUCT | CONTROL CONTENTS | DISPLAY CONTENTS |
|---|---|---|---|---|
| 1 | (NONE) | A | (NORMAL INSTALLATION) | |
| 2 | A | B | (NORMAL INSTALLATION) | |
| 3 | A | C | OVERWRITE mod-a | IN A CASE WHERE "C" IS INSTALLED, "A" IS DELETED. SETTING INFORMATION OF "A" IS HELD. |
| 4 | A | D | OVERWRITE mod-a<br>ADD mod-c | IN A CASE WHERE "D" IS INSTALLED, "A" IS DELETED. SETTING INFORMATION OF "A" IS HELD. |
| 5 | D | E | OVERWRITE mod-a<br>DELETE mod-c<br>ADD mod-d | IN A CASE WHERE "E" IS INSTALLED, "D" IS DELETED. SETTING INFORMATION OF "D" IS HELD. |
| ⋮ | ⋮ | ⋮ | ⋮ | ⋮ |

264

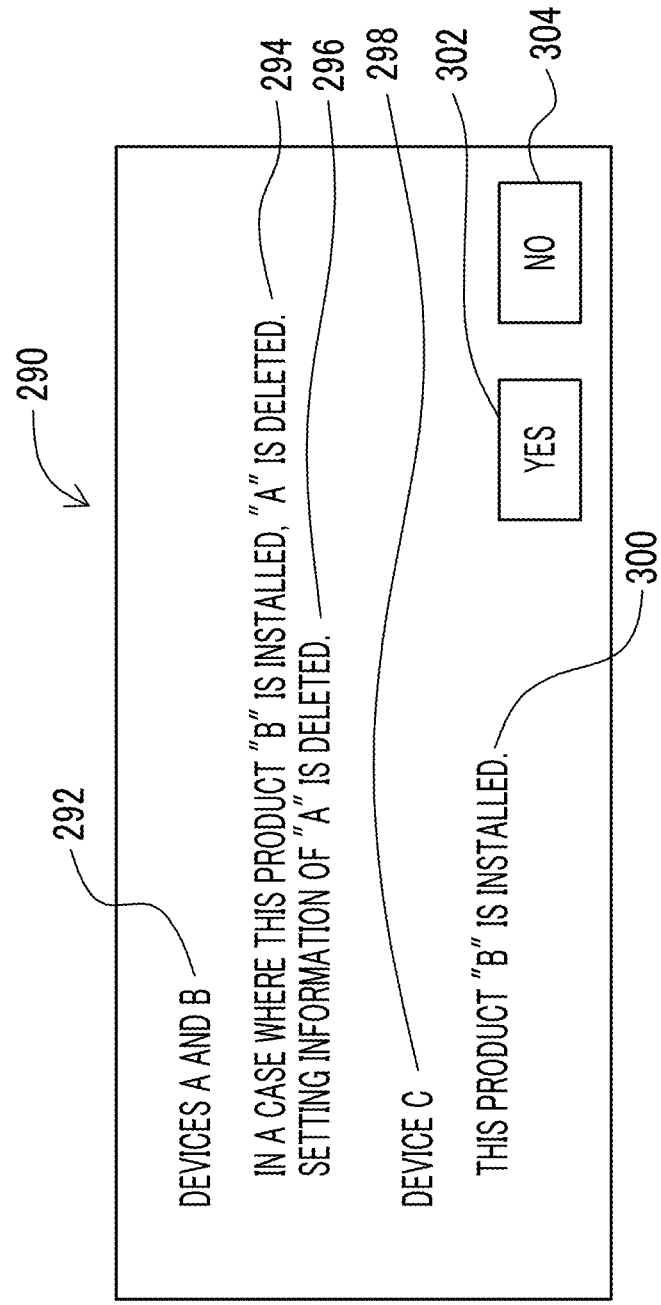

SOFTWARE MANAGEMENT DEVICE, SOFTWARE MANAGEMENT SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-203446 filed Oct. 20, 2017.

BACKGROUND (i) Technical Field

The present invention relates to a software management device, a software management system, and a non-transitory computer readable medium storing a program for software management.

(ii) Related Art

Software management systems are systems that manage software which is installed or to be installed in a device (hereinafter, also referred to as a "software product" or simply a "product" as occasion demands). For example, installation, updating, or uninstallation of software is managed by the system, and a license to the software is managed.

In offices and the like, plural image forming devices connected to a network are used. Software providing an expansionary function required by a user may be installed afterwards (in advance in some cases) with respect to each of the image forming device. The realization of software management systems capable of integrally or unitarily managing such a software group has been expected.

SUMMARY

According to an aspect of the invention, there is provided a software management device including a specification section that specifies a to-be-replaced software product which is a software product having been installed in a device and which is replaced with a target software product, prior to remote installation of the target software product in the device, and a providing section that provides notice information including replacement notice information for giving a notice of the replacement of the to-be-replaced software product with the target software product to a user who attempts to execute the remote installation, prior to the remote installation.

BRIEF DESCRIPTION OF THE DRAWINGS

Exemplary embodiment(s) of the present invention will be described in detail based on the following figures, wherein:

FIG. 4 is a diagram illustrating a configuration example of a user information table;

FIG. 5 is a diagram illustrating a configuration example of a product information table;

FIG. 7 is a diagram illustrating a configuration example of a definition table in a first exemplary embodiment;

FIG. 17 is a diagram illustrating a modification example of a relationship table in the first exemplary embodiment;

FIG. 18 is a diagram illustrating a configuration example of a replacement type definition table in a second exemplary embodiment;

FIG. 20 is a diagram illustrating a configuration example of a relationship table in the second exemplary embodiment;

FIG. 21 is a diagram illustrating an example of notice information for each replacement type in the second exemplary embodiment;

FIG. 23 is a diagram illustrating control contents and display contents for each case in the third exemplary embodiment;

FIG. 26 is a diagram illustrating an example of group notice information constituted by single notice information corresponding to all of plural devices.

DETAILED DESCRIPTION

Hereinafter, an exemplary embodiment of the invention will be described with reference to the accompanying drawings.

1. Overall Description

Figure 1:
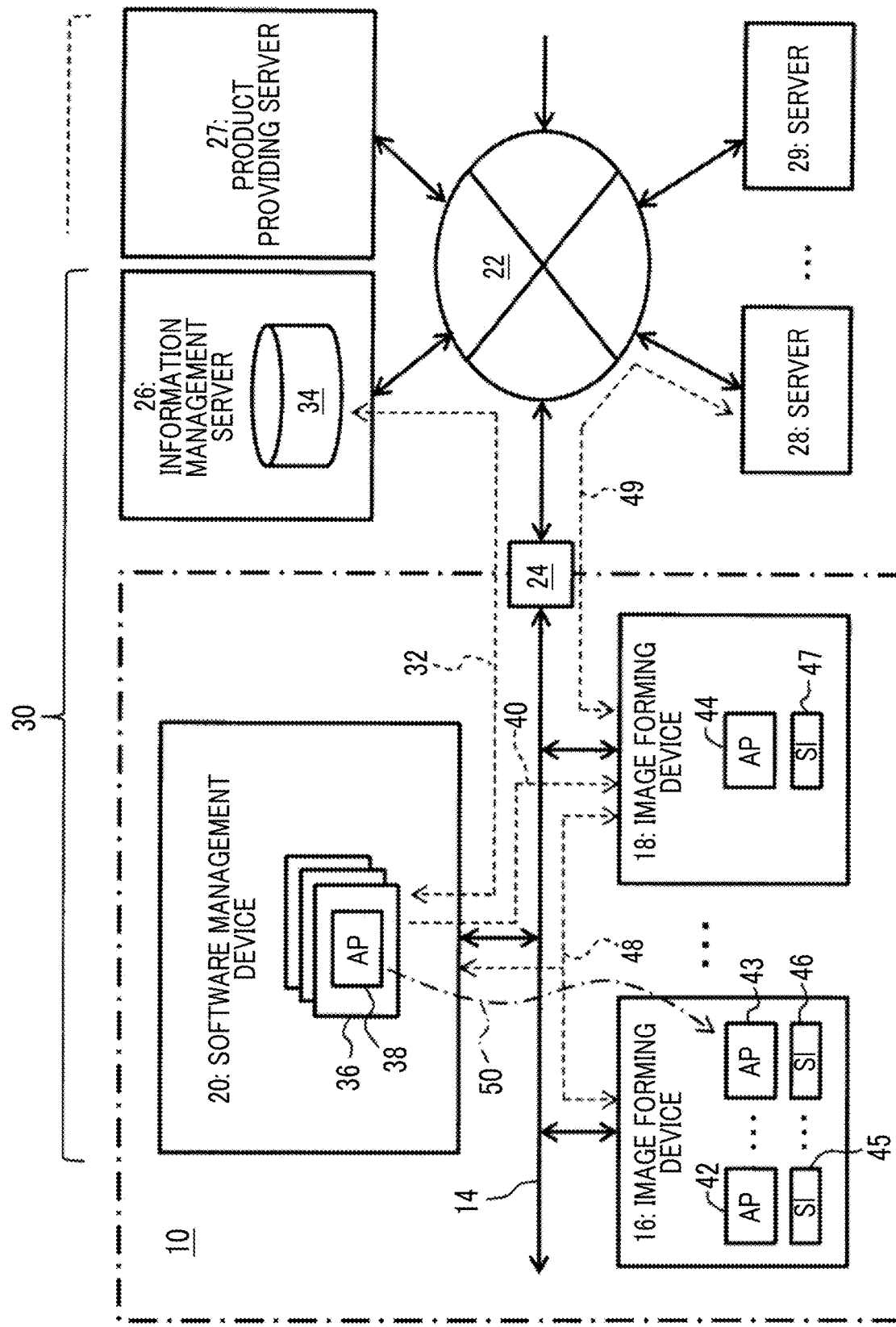
FIG. 1 is a block diagram illustrating a configuration example of a software management system according to an exemplary embodiment.

FIG. 1 illustrates a software management system according to the exemplary embodiment. The software management system is a system that integrally or unitarily manages a software product group which is installed or to be installed in one or plural devices. Typically, each software product is an application program installed in a device in order to expand a function of the device. Naturally, a software product which is installed in the device from the beginning may be an object to be managed. The software product is a software commodity from a point of view of buying and selling. Hereinafter, a software product may be simply referred to as a "product".

In the software management system according to the exemplary embodiment, a device having a software product installed therein is an image forming device. The image forming device is a so-called multifunction machine having plural document processing functions such as a scanner function, a copying function, a printing function, and a facsimile function. The concept of the image forming device also includes a device having one document processing function. A software product installed in another device, such as a general-purpose information processing device or a terminal device for a specific use, may be managed by the software management system.

In the configuration example illustrated in FIG. 1, a Local Area Network (LAN) 14 is provided in an office 10. The office 10 is an example, and an institution provided with the LAN 14 may be a public institution, a school, and the like. Plural image forming devices 16 and 18 are connected to the LAN 14, as plural devices. Each of the image forming devices 16 and 18 has one or plural document processing functions as described above. An image forming device including a finishing unit that performs folding processing, staple processing, and the like may be connected to the LAN 14.

In the configuration example illustrated in the drawing, plural software products (AP) 42 and 43 are installed in the image forming device 16, and the software product (AP) 44 is installed in the image forming device 18. The same software product may be installed in the plural image forming devices 16 and 18. Plural pieces of setting information (SI) 45, 46, and 47 are generated in response to the plural software products 42, 43, and 44, and are held. In operations of the software products 42, 43, and 44, the pieces of setting information 45, 46, and 47 corresponding to the respective software products are referred to. The pieces of setting information 45, 46, and 47 are pieces of information for customizing the software products 42, 43, and 44, and typically are pieces of information which are set or registered by users of the image forming devices 16 and 18. Specifically, printing conditions, user registration information, and the like are included in the pieces of setting information. Specific configuration examples of the image forming devices 16 and 18 will be described later in detail with reference to FIG. 2.

The software management device 20 according to the exemplary embodiment is a device for managing a software product group which is installed or to be installed in the plural image forming devices 16 and 18. The software management device 20 is connected to the LAN 14. The software management device 20 executes or manages the downloading, installation, updating, uninstallation, and the like with respect to each of software products which are used in the plural image forming devices 16 and 18. Such processing is performed in accordance with information provided from an information management server 26 to be described later. The out-of-supporting-related product 42B may be an object to be displayed in the software management device 20, but a user operation for updating and uninstalling the out-of-supporting-related product 42B is restricted in the software management device 20. This will be described later in detail.

Here, installation, updating, and uninstallation are executed on the image forming devices 16 and 18 under the remote control of the software management device 20. From such a point of view, installation, updating, and uninstallation may be referred to as remote installation, remote updating, and remote uninstallation.

The software management device 20 is constituted by, for example, a personal computer (PC) as an information processing device. The software management device may be constituted by a portable terminal device or the like. The software management device 20 may be constituted by plural PCs. In the exemplary embodiment, the software management device 20 is configured as a device which is separate from a device (image forming device). The software management device 20 according to the exemplary embodiment has a function of displaying a product list. As the product list, an installed product list, a usable product list, a purchased product list, and the like may be displayed. A specific configuration example of the software management device 20 will be described later in detail with reference to FIG. 9.

The LAN 14 is connected to the Internet 22 as an external network through a connection apparatus 24. The connection apparatus 24 is constituted by a bridge, a router, a gateway, or the like. The information management server 26 and a product providing server 27 are connected to the Internet 22 in the configuration example illustrated in the drawing, and some servers 28 and 29 are connected to the Internet.

The information management server 26 manages information necessary for managing each software product in the software management device 20, and specifically, user information, license information, product information, and other information, and provides information necessary in the functioning of the information management server with respect to the software management device 20. The necessary information includes information necessary in displaying the product list, information necessary in managing a license, and the like in the software management device 20. In this exemplary embodiment, information (definition information and relationship information) required in the control of remote installation of the software product is provided from the information management server 26 to the software management device 20. This will be described later in detail. The information management server 26 also has a function of providing an installer file corresponding to each software product or information indicating the location of the installer file to the software management device 20. Each installer file includes a software product, an installer for handling the product, and the like, as illustrated later. A specific configuration example of the information management server 26 will be described later in detail with reference to FIGS. 3 to 8.

The software management system 30 according to the exemplary embodiment is constituted by, for example, the software management device 20 and the information management server 26. The devices 20 and 26 may be formed integrally. The software management system 30 may include the product providing server 27 to be described later.

The product providing server 27 is a device that that sells a pay software product (pay product) on-line, and specifically, has a function of performing charging processing on a pay product, a function of delivering the pay product through a network, and the like. The product providing server 27 according to the exemplary embodiment also has a function of delivering a free software product (free product) through a network. In the configuration example illustrated in the drawing, the information management server 26 and the product providing server 27 are operated in association with each other at the time of the selling of a pay product or the provision of a free product. A user may acquire and use a desired product without being especially conscious of which device is accessed, on the condition that a certain condition, such as user registration, is satisfied. Meanwhile, the product providing server 27 may be embedded into the information management server 26. On the contrary, the information management server 26 may be embedded into the product providing server 27. Each of the information management server 26 and the product providing server 27 may be constituted by one or plural information processing devices.

Each of the servers 28 and 29 is a device that provides a certain service to the user in cooperation with software products installed in the image forming devices 16 and 18. Examples of such a service include a document storage service and the like. A software product for requesting a service may be referred to as client software. Naturally, software products to be installed in the image forming devices 16 and 18 may also include a software product which individually functions without requiring the provision of a service by the server. Examples of such a software product include a software product enabling a collective operation by packaging plural user operations.

In a case where a user performs an operation of designating and purchasing a specific pay product on-line in a state where the user logs on the software management system 30, charging processing, the registration of license information, and the like are executed in accordance with the operation (see reference numeral 32). Subsequently, in a case where the user performs a downloading operation, an installer file for installing a purchased product is transmitted to the software management device 20 from the information management server 26 or the product providing server 27 (the same). The downloaded installer file is stored in the software management device 20. With regard to a free product, a corresponding installer file is stored in the software management device 20 through the above-described process. In the configuration example illustrated in the drawing, a downloaded installer file is denoted by reference numeral 36. In this exemplary embodiment, the installer file 36 includes a software product 38 to be subjected to remote installation in the device.

In a case where a user designates an image forming device (for example, the image forming device 18) as an installation destination and performs an installation operation on a software product in the software management device 20, an installer within the installer file 36 functions, so that the software product 38 within the installer file 36 is transmitted to the image forming device designated as an installation destination and is installed in the image forming device (see reference numeral 40). Therefore, the software product functions in an image processing device which is an installation destination. For example, the software product is operated in association with a server (for example, the server 28) (see reference numeral 49). The software management device 20 has a function of creating and displaying an installed product list in retrieving and specifying a software product group installed in plural image forming devices (see reference numeral 48).

In a case where a software product (a to-be-replaced product: see, for example, reference numeral 43) which is replaced with a software product (target product: see, for example, reference numeral 38) to be installed is present in an image processing device (for example, the image forming device 16) which is an installation destination, the to-be-replaced product is automatically deleted prior to or in association with the installation of a target product (see reference numeral 50). In this exemplary embodiment, notice information for giving a notice of the occurrence of product replacement before the deletion is provided to the user.

Meanwhile, the user is a person who has an account capable of logging on the software management system 30, and is the user of the software management system 30. In this manner, the user is conceptually different from a user of an image forming device. Meanwhile, the management of a software product is performed in units of user groups.

2. Description of Installation Related Matters

Installation includes normal (new) installation which is not accompanied by the replacement of a product, and replacement type installation which is accompanied by the replacement of a product. The type in the latter case includes clean installation and overwrite installation.

The clean installation is generally installation of a target product after a to-be-replaced product is deleted. In a case where the clean installation is executed, setting information is normally deleted. Conversely, installation accompanied by the deletion of the setting information may be defined as clean installation. The overwrite installation is generally installation for performing replacement on one or plural portions required to be replaced, among plural portions constituting a to-be-replaced product. As a result, all of the products to be replaced are set to be objects to be replaced. In a case where the overwrite installation is executed, setting information is normally maintained (held). Actually, in a case where setting maintenance (holding) is performed before and after substitution, a setting value to be transitioned of a to-be-replaced product may be set at a predetermined location of a to-be-replaced product in addition to a case of simple replacement, but installation in which setting information is maintained is defined as overwrite installation.

The software management system according to the exemplary embodiment is a system that previously arranges a relationship between a target product and a to-be-replaced product with plural installation types as a premise, and performs installation control and display control in accordance with an installation type specified on the basis of the relationship. Meanwhile, in the specification of this application, the concept of deletion of a software product and setting information may include apparent deletion in software management. That is, the deletion is a concept including a case where the software product is not seen by the user of the software management device.

Examples of a replacement type in replacement type installation include replacement of a non-regular version with a regular version (first replacement type), replacement of a free version with a pay version (second replacement type), replacement of an individual product version with a product set version (third replacement type), and replacement of a supply termination version with a succession version (fourth replacement type). Each of the replacement types is provided for convenience. Briefly describing each of the replacement types, a non-regular version is, for example, an experience version in the first replacement type. In such a replacement type, function restriction or use period restriction which is imposed in the experience version is excluded by, for example, an installation operation of the regular version. In the second replacement type, the replacement of the free version with the pay version has, for example, function addition (upgrading) as the substance thereof. In the third replacement type, the product set version is typically a package product including individual product versions. In the fourth replacement type, a version obtained by revising the supply termination version in whole or in part is a succession version.

In any case, even in a case where similarity or substitutability as substance is established between a target product and a to-be-replaced product in the above-described product replacement, it looks like replacement with another product has been performed in a case of being seen from the user. In other words, the user may have a problem that another product is not suddenly seen after the target product is installed. Consequently, also in the software management device according to this exemplary embodiment, in a case where the remote installation of a target product in a device is performed, it is determined whether or not a to-be-replaced product in the device is present. In a case where the to-be-replaced product is present, information (replacement notice information) for giving a notice of the replacement of the to-be-replaced product with the target product is provided to the user of the software management device. A specific example thereof will be described later with reference to FIG. 11 and the like.

3. Description of Image Forming Device

Figure 2:
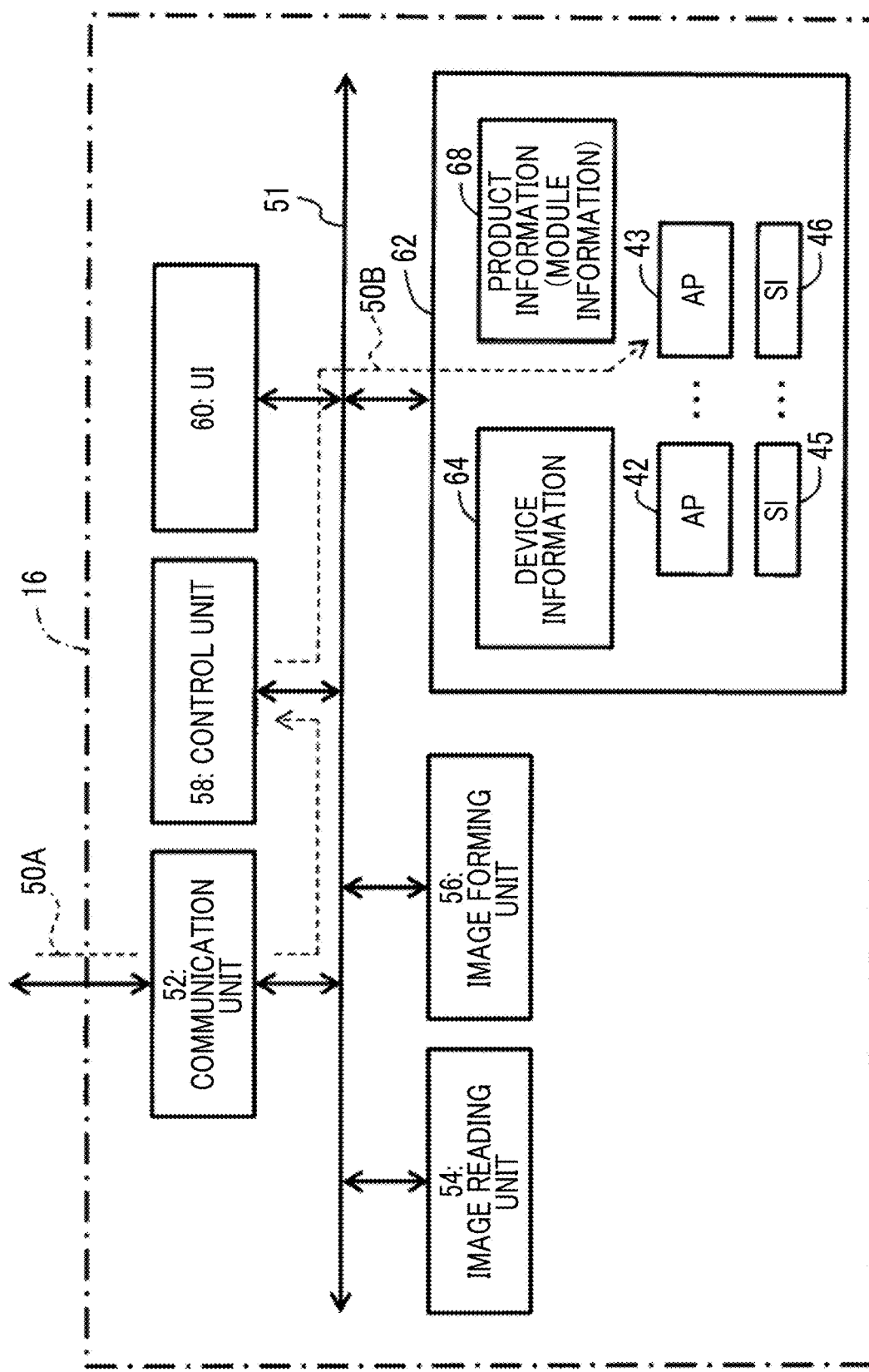
FIG. 2 is a block diagram illustrating a configuration example of an image forming device illustrated in FIG. 1.

FIG. 2 illustrates a configuration example of the image forming device 16. Meanwhile, the image forming device 18 illustrated in FIG. 1 has the same configuration as the image forming device 16.

In FIG. 2, a communication unit 52, an image reading unit 54, an image forming unit 56, a control unit 58, a User Interface (UI) 60, and the like are connected to an internal bus 51. The communication unit 52 is connected to a LAN. The image reading unit 54 reads a physical document to generate an electronic image (electronic document) of the physical document. The image forming unit 56 prints the electronic document on a sheet. The control unit 58 is equivalent to a CPU and various programs. The UI 60 is constituted by, for example, a Liquid Crystal Display (LCD) with a touch sensor. A memory 62 stores device information 64 and product information 68. Further, the plural installed software products (AP) 42 and 43 are stored. For example, the software product 42 is executed on the control unit 58, and thus a service based on the software product 42 is provided.

The device information 64, which is information for specifying the device type of the image forming device 16, includes, for example, a device type ID. The device information 64 may include information indicating an installation location of the image forming device 16. The product information 68, which is information for specifying each software product installed, includes, for example, a product ID.

The software management device according to the exemplary embodiment has a function of specifying each product from a module configuration of each product even in a case where an ID of each product may not be acquired from the image forming device 16. In a case where such a function is used, information (module information) indicating a module configuration is stored in the image forming device 16 as the product information 68. The module information is prepared for each product, and is information for specifying one or plural modules (components) constituting the product. Specifically, the module information includes a module ID for each module, a version, and the like. Naturally, the specification of the product based on the module information is just an example.

In an installation process for a software product, a software product is transmitted from the software management device to the control unit 58 under the control of the software management device (see reference numeral 50A), and the software product having gone through the control unit 58 is stored on the memory 62 (see reference numeral 50B). The software product may be directly written in the memory 62 from the software management device.

4. Description of Information Management Server

Figure 3:
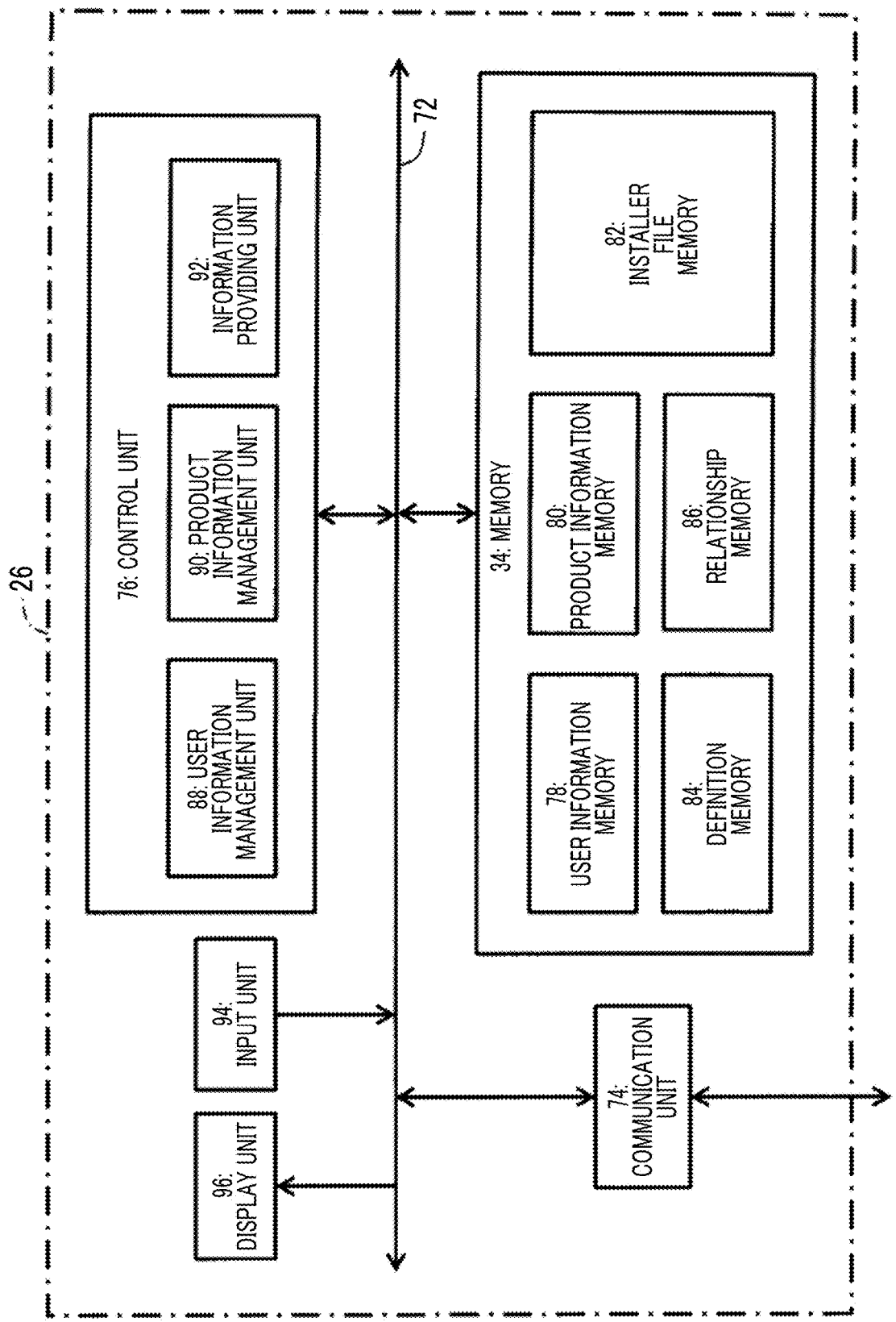
FIG. 3 is a block diagram illustrating a configuration example of an information management server illustrated in FIG. 1.

FIG. 3 illustrates a configuration example of the information management server 26. A communication unit 74, a control unit 76, a memory 34, an input unit 94, a display unit 96, and the like are connected to an internal bus 72. The memory 34 functions as a database as described above, and the memory 34 includes a user information memory 78, a product information memory 80, an installer file memory 82, a definition memory 84, and a relationship memory 86 in the configuration example illustrated in the drawing.

User information is stored in the user information memory in units of users. The user information includes information for specifying a user, and further includes license information. The license information may be associated with the user information instead of being included in the user information. The user information will be described later with reference to FIG. 4.

The license information includes, for example, information for specifying a purchasing user, information for specifying a pay product to be subjected to licensing, and information indicating use conditions and a use state with respect to the pay product. For example, the number of installable times (total), the number of times of installation having been executed so far (actual results), the number of times of installation which is executable from now on (remaining number), and the like may be specified. A product may be managed in accordance with the number of users who use the product or the number of devices that install the product. In addition, the license information may include license keys in units of installation.

The product information memory 80 stores product information for each product. The product information includes product basic information, product configuration information (module information), and the like. This will be described later with reference to FIG. 5.

The installer file memory 82 is provided within the information management server 26 as necessary. The installer file memory 82 stores, for example, plural installer files corresponding to plural products. Each of the installer files is a file in which plural program and data are packaged. The installer file memory 82 may be provided in a device such as a product providing server. A configuration example of the installer file will be described later with reference to FIG. 6.

The definition memory 84 stores a definition table in which control contents during the execution of remote installation in the software management device are defined. This will be described later in detail with reference to FIG. 7. The relationship memory 86 stores a relationship table in which a correspondence relationship between a target product and a to-be-replaced product is described. This will be described later in detail with reference to FIG. 8. In this exemplary embodiment, both the definition table and the relationship table are unitarily managed in the information management server 26, but either one or both of the tables may be individually managed in the software management device.

The control unit 76 is constituted by a CPU and various programs. In FIG. 3, plural functions of the control unit 76 are illustrated as plural blocks. A user information management unit 88 is a module that registers user information for each user and manages the registered user information. The user information management unit 88 may exhibit a user authentication function. A user authentication unit may be provided separately. The user information stored in the user information memory 78 is referred to during the user authentication. A product information management unit 90 is a module that registers product information for each product and manages the registered product information. In addition, a definition information management unit or a relation information management unit may be provided.

The information providing unit 92 is a module that extracts and integrates information necessary in performing the management of a software product in the software management device and provides the information to the software management device. The provided information includes, for example, user information, usable product list information list information, and license information. The license information may be provided as a portion of the user information or a portion of the usable product list information. In this exemplary embodiment, the definition table and the relationship table are provided to the software management device by the information providing unit 92.

FIG. 4 illustrates an example of a user information table stored in a user information memory. In the configuration example illustrated in the drawing, a user information table 100 includes plural records 102, 104, and 106. Each of the records 102, 104, and 106 includes plural pieces of information, and each of the records includes, for example, a user ID, a user name, an acquired product ID, one or plural license keys, a code (Y/N) indicating whether or not a product has been used for each license key, and the like. For example, a permitted number of license keys are issued on the basis of the license information. The license key is required at the time of the installation of a product. In the example illustrated in the drawing, a license key is not associated with respect to a free product. More detailed license information (a license mode, a validity period, and the like) may be managed on the user information table 100.

FIG. 5 illustrates a configuration example of a product information table. A product information table 110 illustrated in the drawing is stored on a product information memory in an information management server. The product information table 110 substantially includes product basic information 112 and product configuration information 114. The product basic information 112 includes a product ID, a version, the year, month, and day of release, a target device type list, and the like for each product. The target device type list is information for specifying one or plural devices that may serve as an installation destination of the product, and specifically, includes one or plural device type IDs. The product basic information 116 includes a Uniform Resource Locator (URL) of an installer file.

The product configuration information 114 is information for specifying a module configuration for each product. One or plural pieces of module information are managed for each product, and relation information (see reference numeral 117) for specifying a correlation between plural modules is also managed. Examples of the correlation include an "or" relation, an "and" relation, an inclusion relation, and the like. Specifically, the module information is constituted by a module ID, a version, a target type list, and the like in the example illustrated in the drawing. In the software management device, one or plural products installed in the image forming device are specified by butting the product configuration information for each product which is received from the information management server and the module information received from the image forming device. Naturally, in a case where a product ID of a product installed in the image forming device is managed on the image forming device, the product ID may be referred to.

Figure 6:
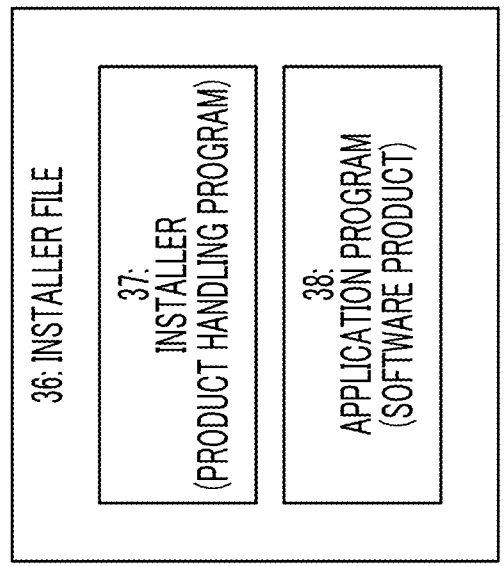
FIG. 6 is a diagram illustrating an example of an installer file.

FIG. 6 illustrates a configuration example of the installer file stored in the installer file memory. The installer file 36 includes an installer 37 as a product handling program and an application program 38 as a software product. In the software management device, in a case where the user performs a downloading operation, the installer file 36 to be subjected to the operation is downloaded to the software management device. Thereafter, in a case where the user performs an installation operation, the installer 37 within the installer file 36 is started up, and the application program 38 is transmitted from the software management device to a specific image forming device by the operation, and is installed.

FIG. 7 illustrates a configuration example of the definition table stored in the definition memory. A definition table 118 is provided from the information management server to the software management device, for example, during the start-up (during the user's login) of the software management device.

In the example illustrated in the drawing, the definition table 118 is constituted by plural records corresponding to plural control codes, and each of the record is constituted by information in which contents of installation control and contents of display control are defined. As the control code, three control codes of C1, C2, and C3 are determined in the example illustrated in the drawing. The control code C1 is a code for giving an instruction for executing clean installation, and notice information for giving a notice of the deletion of a to-be-replaced product and the deletion of setting information is displayed prior to the execution. The control code C2 is a code for giving an instruction for executing overwrite installation, and notice information for giving a notice of the deletion of a to-be-replaced product and the succession (taking over) of setting information is displayed prior to the execution. The control code C3 is a code for giving an instruction for prohibiting installation, and the user is notified of the impossibility of installation. The definition table illustrated in FIG. 7 is just an example. The definition table may be integrated with a relationship table described below.

Figure 8:
FIG. 8 is a diagram illustrating a configuration example of a relationship table in the first exemplary embodiment.

FIG. 8 illustrates a configuration example of the relationship table stored in the relationship memory. A relationship table 119 is provided from the information management server to the software management device, together with the definition table, for example, during the start-up of the software management device (during the user's login).

In the example illustrated in the drawing, the relationship table 119 has a record for each target product, and a target product (product code), the name of the target product, an installed related product (product code), and a control code designated by a relationship with the related product are written in each record.

For example, in a case where a product XXX-B is installed in a designated device, a record of the product is referred to prior to the installation. It is determined whether or not a product XXX-A registered therein is present within the designated device. In a case where the product is present, control instructed by the control code C1 is executed. Specifically, notice information including replacement notice information for giving a notice of the replacement of the product XXX-A with the product XXX-B and non-succession notice information for giving a notice of the deletion of the setting information thereof is displayed. Then, in a case where the user's execution operation is performed, clean installation with respect to the product XXX-B is executed. In a case where the product XXX-A is installed in the designated device, a record of the product is referred to prior to the installation. It is determined whether or not the product XXX-B registered therein is present within the designated device. In a case where the product is present, control instructed by the control code C3 is executed. Specifically, a notification for disabling the installation of the product XXX-A is displayed. For example, in a case where the product XXX-A having already been installed is newer and the product XXX-B is order, installation is prohibited. In a case where the product YYY-B is installed in the designated device, a record of the product is referred to prior to the installation. It is determined whether or not a product YYY-A registered therein is present within the designated device. In a case where the product is present, control instructed by the control code C2 is executed. Specifically, notice information including replacement notice information for giving a notice of the replacement of the product YYY-A with a product YYY-B and succession notice information for giving a notice of the succession of the setting information thereof is displayed. Then, in a case where the user's execution operation is performed, overwrite installation with respect to the product YYY-B is executed.

In this manner, the relationship table is a table for specifying a replacement relationship for each combination of a target product and a to-be-replaced product, and for defining control contents during installation. In a case where a new replacement relationship is generated, a record is added to the relationship table. In a case where the relationship table is managed in the information management server, it is possible to use the relationship table in common in plural software management devices. The relationship table illustrated in FIG. 8 is an example, and may use a relationship table having another configuration.

5. Description of Software Management Device

Figure 9:
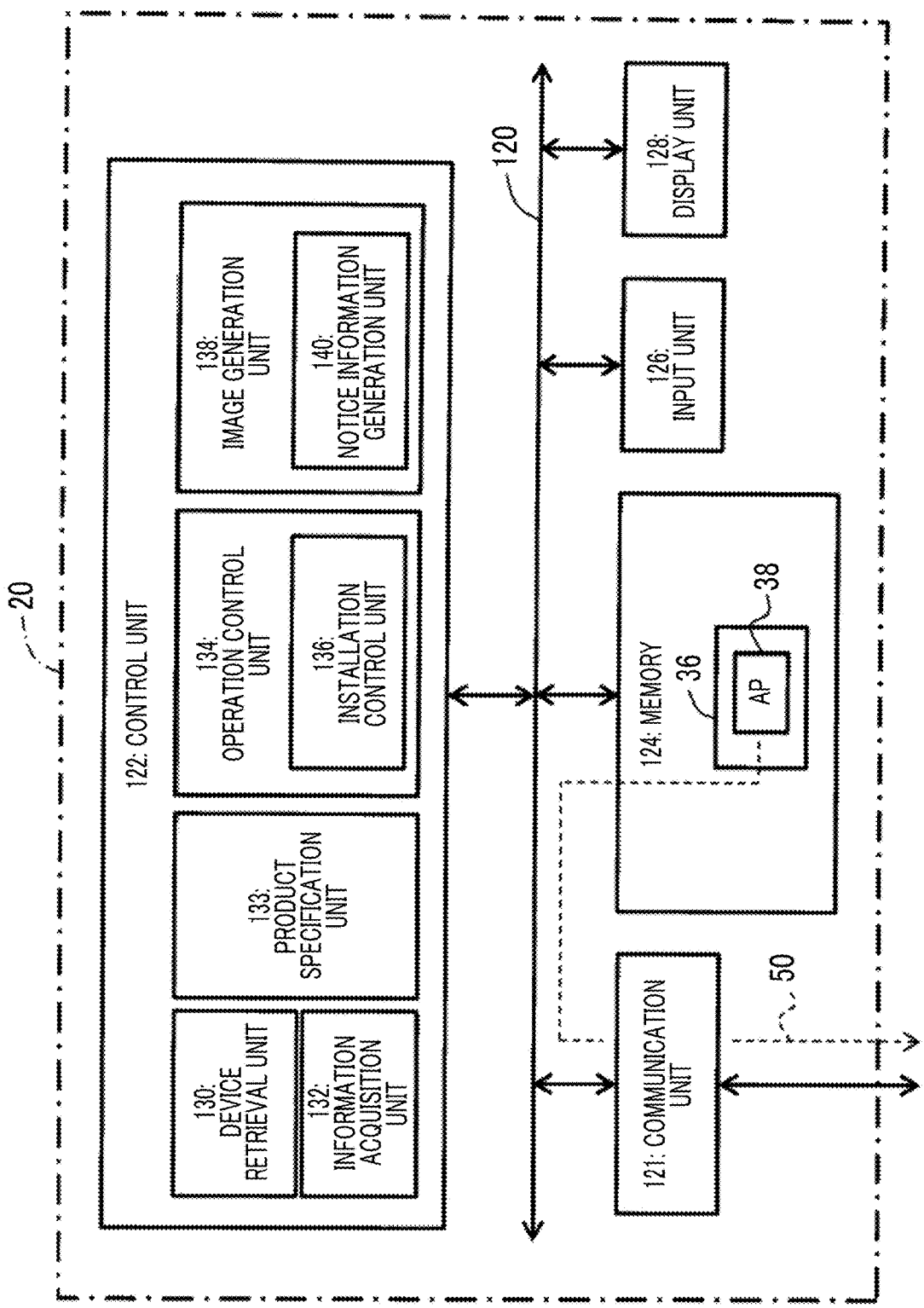
FIG. 9 is a block diagram illustrating a configuration example of a software management device illustrated in FIG. 1.

FIG. 9 illustrates a configuration example of a software management device. The software management device 20 includes an internal bus 120, and a communication unit 121, a control unit 122, a memory 124, an input unit 126, a display unit 128, and the like are connected to the internal bus 120. The communication unit 121 connects a LAN and the internal bus 120 to each other. The control unit 122 is equivalent to a memory that stores a CPU and various programs (including a software management program). The various programs may be stored in the memory 124 to be described below.

The memory 124 stores the downloaded installer file 36 and the like. The installer file 36 includes the software product 38 as an application program as described above. Information acquired from each image forming device and information acquired from the information management server are also stored in the memory 124 as necessary. The input unit 126 is constituted by an input device such as a keyboard or a mouse. The input unit 126 functions as a section that selects a target product, a section that selects an installation destination, a section that gives an instruction for executing installation, and the like. The display unit 128 is constituted by a display such as an LCD. The display unit 128 functions as a section that provides (specifically, displays) notice information.

In FIG. 9, plural functions of the control unit 122 are illustrated as plural blocks. The device retrieval unit 130 searches for one or plural image forming devices (devices) which are connected to the LAN in accordance with retrieval conditions. As the retrieval conditions, a retrieval range (for example, a locational range) may be determined. The information acquisition unit 132 acquires device information and product information from each image forming device which is specified by searching. The device information is, for example, a device ID. The product information is information for specifying each product installed, and specifically, is module information for specifying a product. The information acquisition unit 132 also acquires user information, product configuration information, and the like which are provided from the information management server.

The product specification unit 133 specifies one or plural products (installed products) installed in the image forming device by butting the module information acquired for each product and the product configuration information of each product which is obtained from the information management device. For example, in a case where a combination of two module IDs with respect to two modules constituting the installed product and a combination of two module IDs with respect to a specific product defined in the product configuration information are consistent with each other, the installed product is determined to be the specific product. Naturally, in a case where a product ID may be acquired as product information from each image forming device, it is not necessary to perform such butting processing. Meanwhile, a list of usable products for each user is managed, and the specification of installed product is performed on a product which is usable by each user. Naturally, all of the installed products may be specified.

The operation control unit 134 receives a user operation for a product, and executes a command instructed in accordance with the user operation. Plural types of user operations to be received include a downloading operation for an installer file, a remote installation operation for a software product, a remote updating operation for the product, and a remote uninstallation operation for the product in the exemplary embodiment. In FIG. 9, a portion taking charge of installation control, among plural functions of the operation control unit 134, is illustrated as an installation control unit 136. The installation control unit 136 specifies a target product and a target device in a case where an installation operation has been performed, specifies a to-be-replaced product with respect to the target product on the basis of the relationship table, and determines whether or not the to-be-replaced product is present within the target device. In a case where the to-be-replaced product is present within the target device, display control and installation control are executed in accordance with a control code described in the relationship table (see reference numeral 50). In this manner, the installation control unit 136 functions as a section that specifies a to-be-replaced product which corresponds to the target product. The operation control unit 134 also has a function of controlling and executing remote installation with respect to a device group. This will be described later.

The image generation unit 138 functions as an image (information) generation section or a display processing section. The image generation unit 138 generates an installed product list and the like as a product list. The installed product list is installed in a selected image forming device, and is constituted by one or plural items indicating one or plural products specified by the product specification unit 133. The image generation unit 138 generates a usable product list and the like on the basis of information obtained from the information management server.

The image generation unit 138 includes notice information generation unit 140 that functions during installation. The notice information generation unit 140 is a module that generates notice information including replacement notice information and succession (or non-succession) notice information. As shown later in a specific example, contents of the notice information may be changed in accordance with a replacement type. The notice information generation unit 140 functions as a section that provides the notice information to the user.

6. Description of Operation

Figure 10:
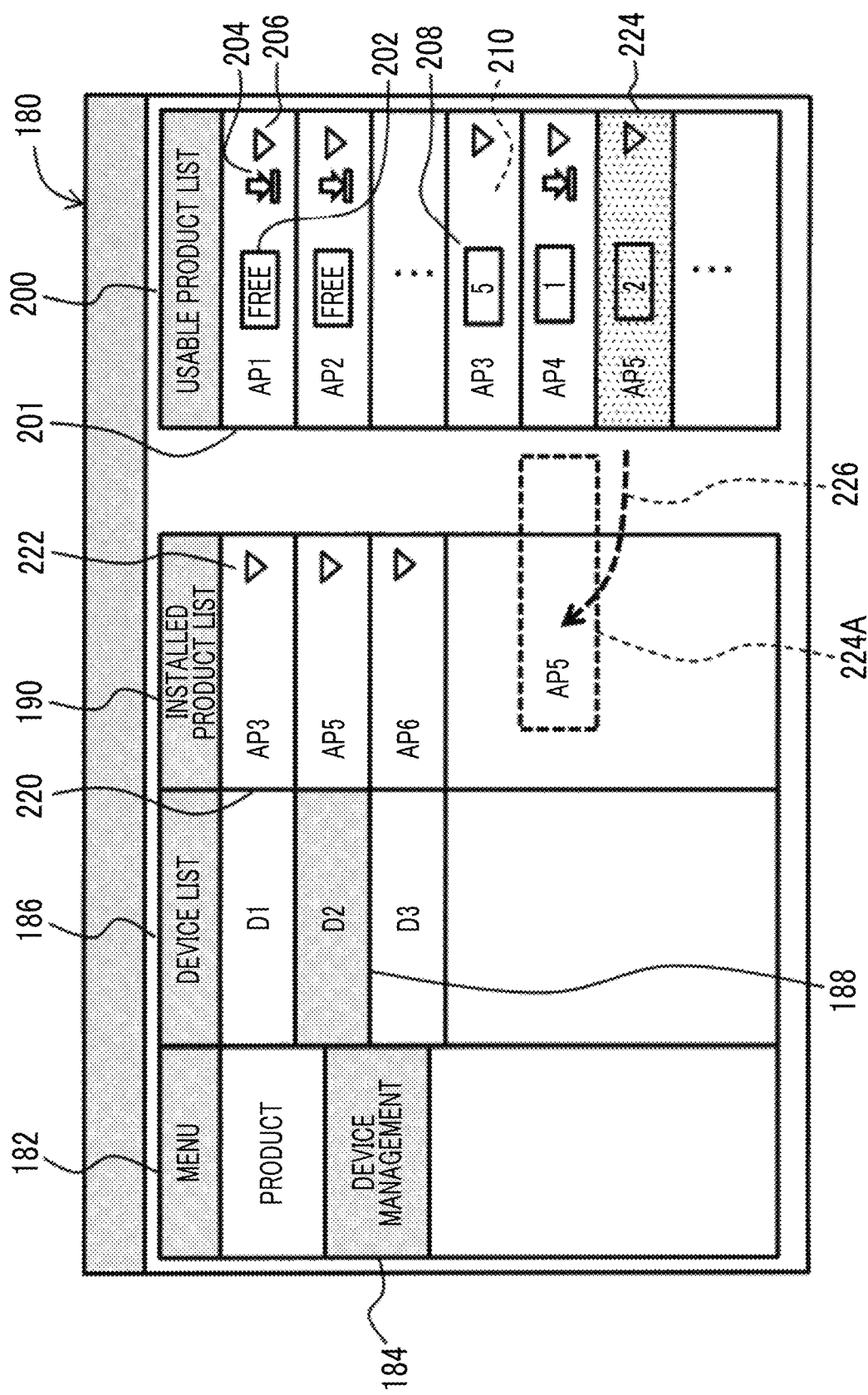
FIG. 10 is a diagram illustrating an example of an installation operation on a display image.

FIG. 10 illustrates an example of an image displayed on a software management device. A menu column 182 is displayed on the left side of an image 180. The menu column 182 includes two items (buttons). In the example illustrated in the drawing, device management is selected as indicated by reference numeral 184. In response to this, a device list 186 is displayed on the left side of the menu column 182. The device list 186 includes plural items corresponding to plural image forming devices specified by retrieval. In the example illustrated in the drawing, an item 188 is selected, and an installed product list 190 is displayed on the right side of the device list. The installed product list includes plural items 220 indicating plural products installed in a selected device. Meanwhile, a device group constituted by plural devices is defined by the user as necessary. The remote installation of a product, and the like can be performed in units of device groups.

A maintenance button 222 displayed in each of the item 220 is a button which is operated or designated prior to updating and uninstallation operations, in a case where the updating and uninstallation operations are desired to be performed on an installed product.

A usable product list 200 is displayed on the right side of the image 180. The usable product list 200 includes plural items 201. In the example illustrated in the drawing, each item 201 corresponds to a pay product or a free product. A mark 202 indicates a free product. A button 204 is a downloading button. A button 206 is the above-described maintenance button. A numeral specified by reference numeral 208 indicates the number of licenses with respect to a pay product, and particularly, the number of remaining licenses (the number of installable times). In a case of a product for which downloading has been completed, a downloading mark is set to be in a non-display mode (see reference numeral 210).

In a case where a specific product is desired to be installed in a specific device, for example, a drag-and-drop operation is performed on an item 224. For example, an alias symbol 224A of the item 224 is dragged as shown by reference numeral 226, and is dropped on the specific device or the installed product list 190. This operation is equivalent to product selection and device selection.

Figure 11:
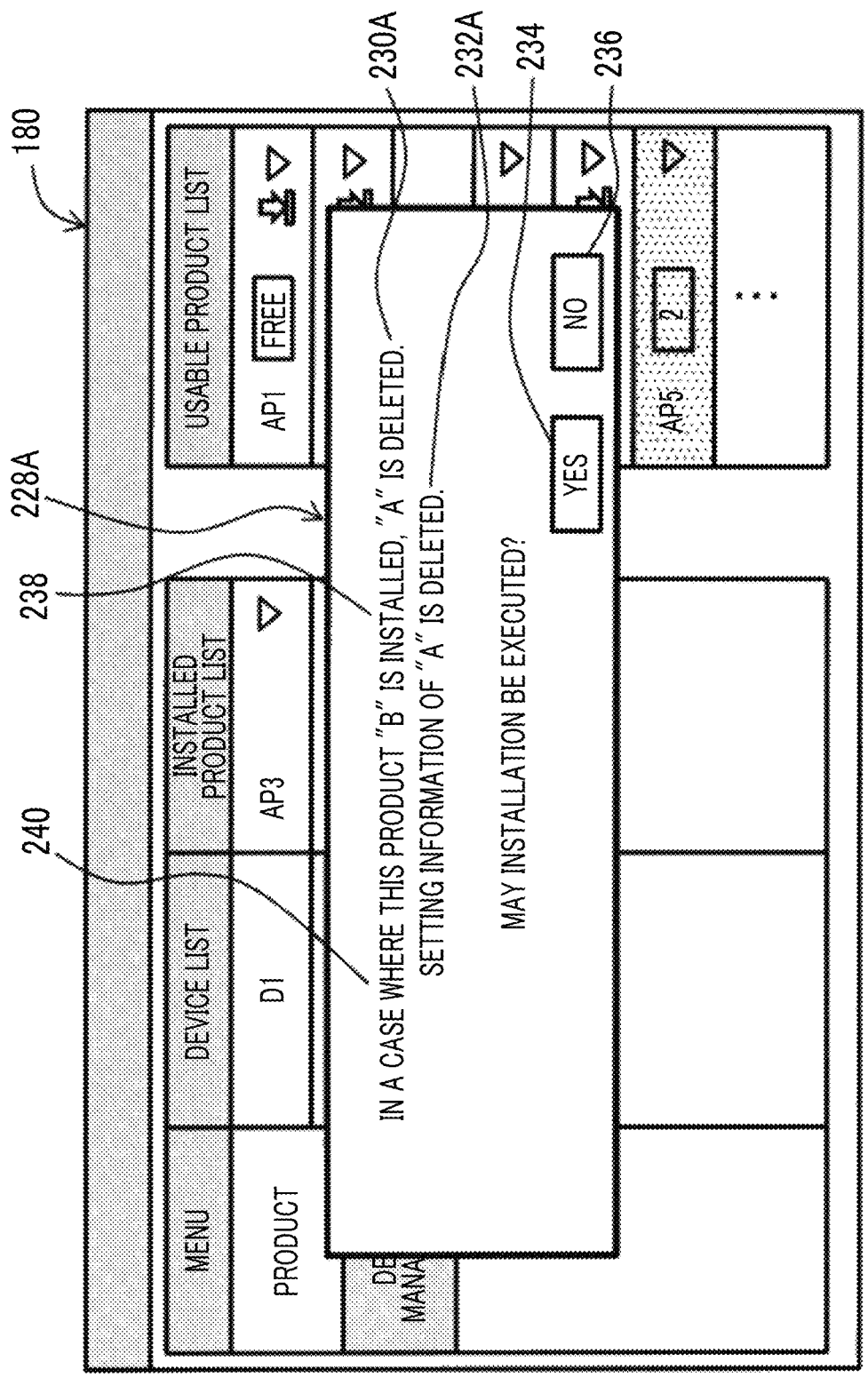
FIG. 11 is a diagram illustrating notice information displayed prior to clean installation.

In a case where a to-be-replaced product replaced with a target product is present and the control code C1 (clean installation) (see FIG. 7) is designated with respect to a combination of the target product and the to-be-replaced product in a device which is an installation destination, the pop-up display of notice information 228A is performed as an image, for example, as illustrated in FIG. 11. The notice information 228A includes replacement notice information 230A and non-succession information 232A. In the example illustrated in the drawing, the name of the to-be-replaced product is automatically inserted into "A" and the name of the target product is automatically inserted into "B" within the replacement notice information 230A. In the example illustrated in the drawing, the replacement notice information 230A is a message of "in a case where this product "B" is installed, "A" is deleted.". The non-succession information 232A is a message of "setting information of "A" is deleted.". Naturally, these are just examples, and information explaining control contents defined by the control code C1 is displayed in any case.

In this manner, in a case where the notice information is displayed, the user can precisely recognize a situation occurring after installation (disappearance of the to-be-replaced product, non-succession of the setting information). A problem, such as uneasiness or confusion due to the sudden invisibleness of a software product after the installation, does not occur. A button 234 or 236 is operated by the user referring to the notice information 228A.

Figure 12:
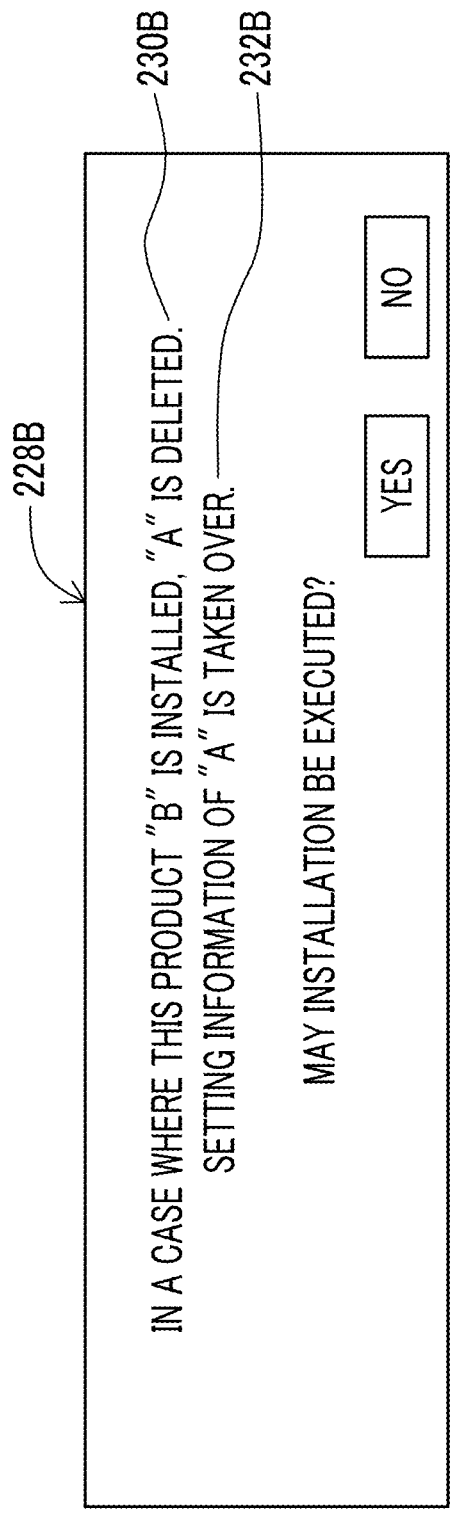
FIG. 12 is a diagram illustrating notice information displayed prior to overwrite installation.

In a case where the control code C2 (overwrite installation) (see FIG. 7) is designated with respect to the combination of the target product and the to-be-replaced product, the pop-up display of the notice information 228B is performed as an image, for example, as illustrated in FIG. 12. The notice information 228B includes replacement notice information 230B and succession information 232B. In the example illustrated in the drawing, the name of the to-be-replaced product is automatically inserted into "A", and the name of the target product is automatically inserted into "B" within the replacement notice information 230B. In the example illustrated in the drawing, the replacement notice information 230B is a message of "in a case where this product "B" is installed, "A" is deleted.". The succession information 232B is a message of "setting information of "A" is taken over.". Naturally, these are just examples, and information explaining control contents defined by the control code C2 is displayed in any case.

In this manner, in a case where the notice information is displayed, the user can precisely recognize a situation occurring after installation (disappearance of the to-be-replaced product, non-succession of the setting information), and the same advantages described above are obtained.

Figure 13:
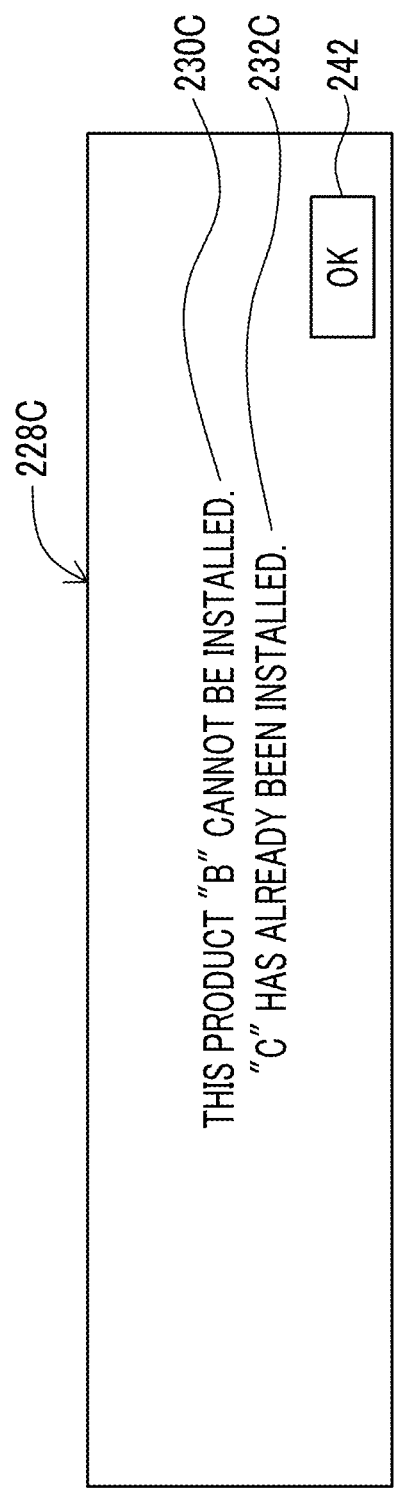
FIG. 13 is a diagram illustrating a notification displayed in a case where installation cannot be performed.

In a case where the control code C3 (installation prohibition) (see FIG. 7) is designated with respect to the combination of the target product and the to-be-replaced product, the pop-up display of a notification 228C is performed as an image, for example, as illustrated in FIG. 13. The notification 228C includes a message indicating impossibility of installation. In the example illustrated in the drawing, the name of the target product is automatically inserted into "B", and the name of an installed product equivalent to a high-level product of the target product is automatically inserted into "C". In the example illustrated in the drawing, the notification 228C is a message of "This product "B" cannot be installed. "C" has already been installed.". Naturally, this is just an example. By such display, the user can recognize that the installation of the target product is not necessary. Similarly, it is possible to avoid installation with little necessity in advance.

Figure 14:
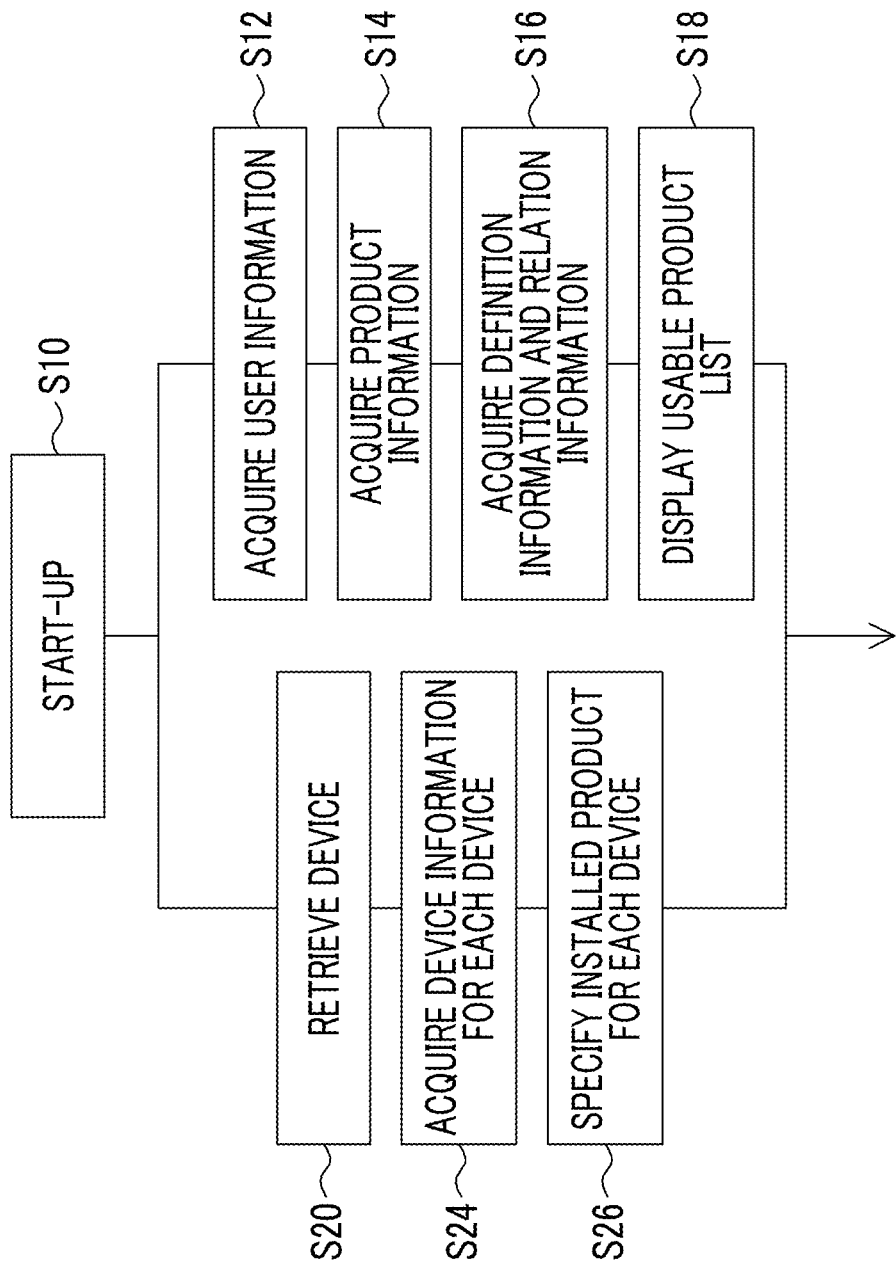
FIG. 14 is a flowchart illustrating operations during the start-up of the software management device.

In FIG. 14, an operation example during the start-up of the software management device is shown as a flowchart. In S10, in a case where the software management device is started up, and specifically, in a case where user authentication is completed by the user's logging on the software management system, steps S12 to S18 and steps S20 to S26 are automatically executed in parallel.

In S12, user information provided from the information management server is acquired in the software management device. In S14, product information provided from the information management server is acquired in the software management device. In S16, definition information (definition table) and relation information (relationship table) provided from the information management server are acquired in the software management device. In S18, an image including a usable product list and the like is displayed in the software management device. On the other hand, in S20, a device is retrieved through a network. In S24, device information is acquired for each device. In S26, one or plural installed products are specified for each device on the basis of the acquired device information. Thereafter, a state where the user's operation can be received is formed.

Figure 15:
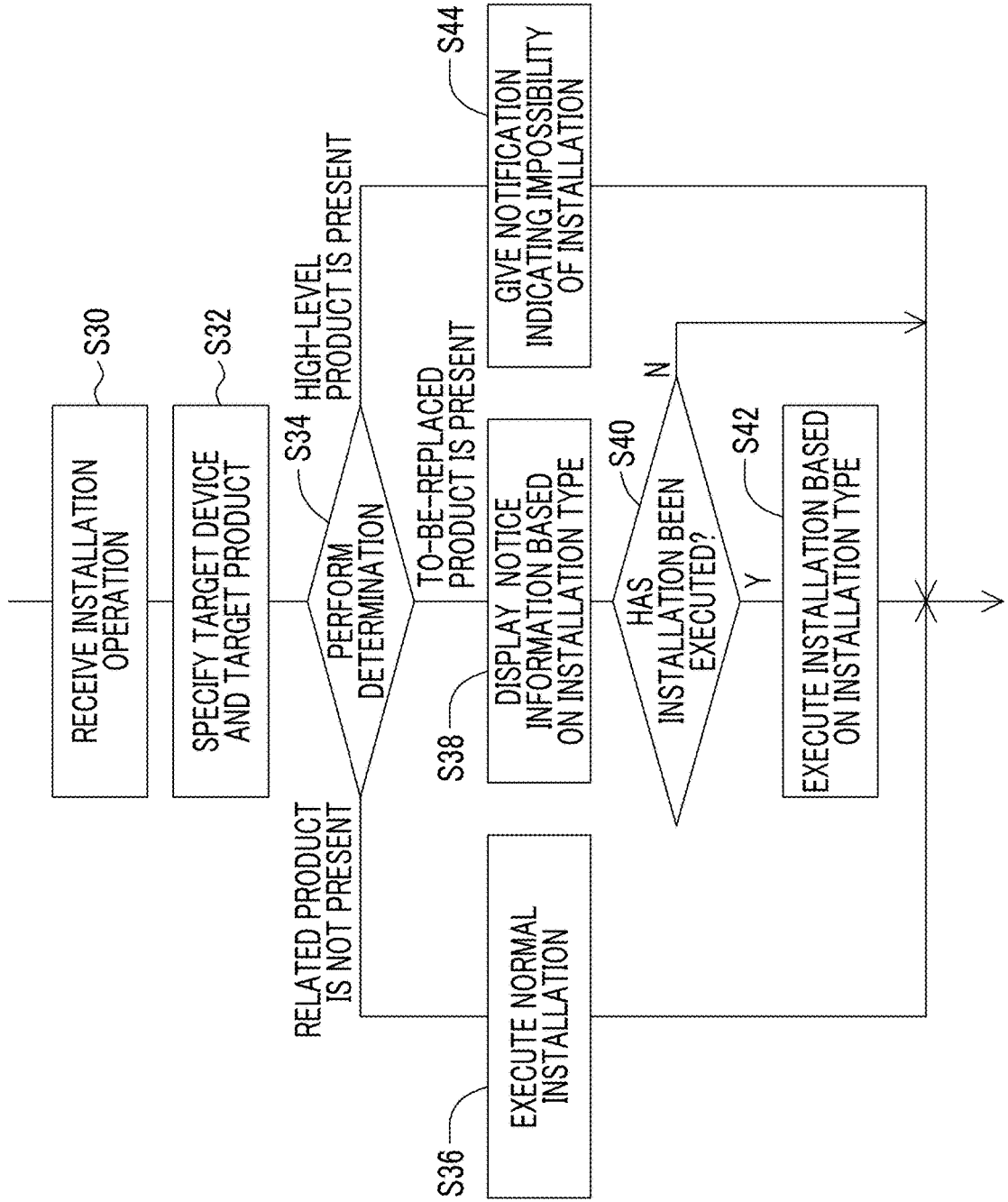
FIG. 15 is a flowchart illustrating operations of the software management device in a case where an installation operation is performed.

In FIG. 15, an operation example in a case where a remote installation operation is performed on the software management device is shown as a flowchart. In S30, the user's installation operation is received. In S32, a target device which is an installation destination and a target product to be installed are specified. In S34, an installed product list for the target device is referred to, and it is determined whether or not a to-be-replaced product to be replaced with the target product is present and whether or not a product located at a level higher than the target product is present.

In S34, in a case where it is determined that a product related to the target product is not present, normal (new) installation for the target product is executed in S36. In S34, in a case where it is determined that a to-be-replaced product is present, notice information based on an installation type is generated and displayed in S38. Then, in a case where an instruction for executing installation is input by the user in S40, the installation of the target product is actually executed under installation conditions based on an installation type in S42. Since the installation of the target product is executed after the user recognizes a situation after the installation, it is possible to prevent the user from feeling uneasy or being confused due to sudden disappearance of a software product after the installation. In S34, in a case where it is determined that a product located at a level higher than the target product has been installed, a notice of impossibility of installation is given in S44. Thereby, it is possible to avoid unnecessary installation equivalent to downgrading.

7. Description of Modification Example and Another Exemplary Embodiment

Figure 16:
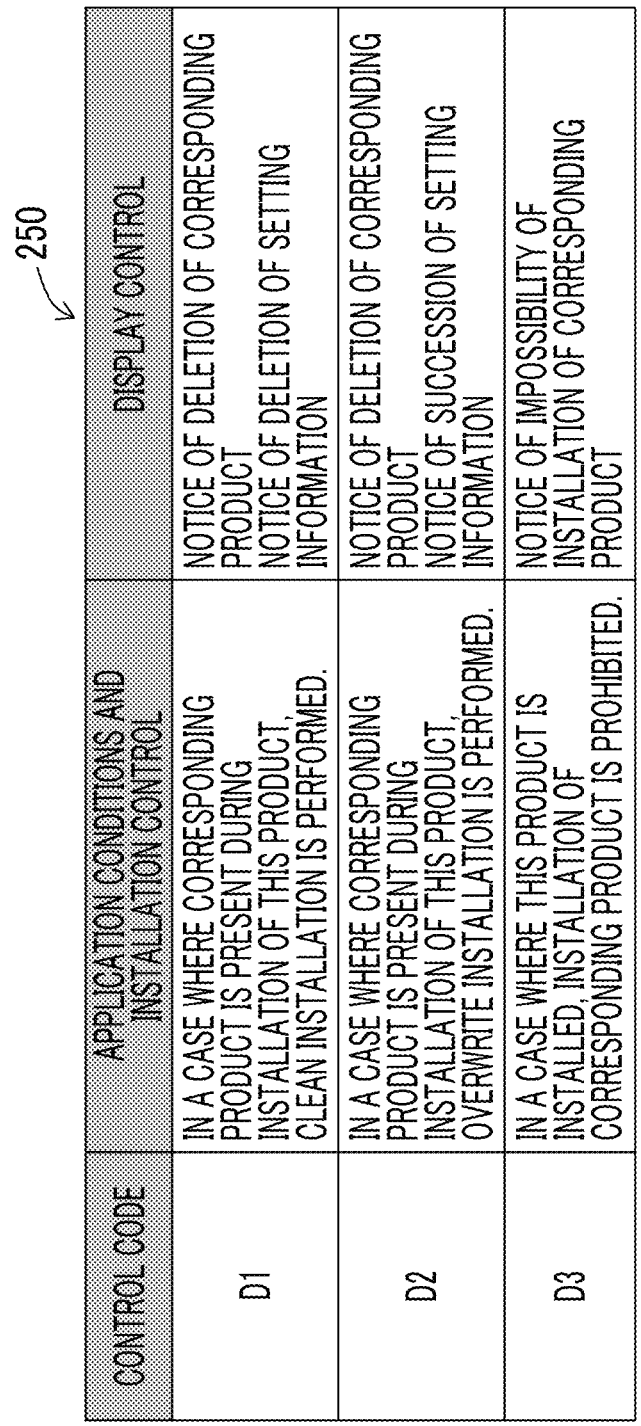
FIG. 16 is a diagram illustrating a modification example of a definition table in the first exemplary embodiment.

FIG. 16 illustrates a modification example of a definition table, and FIG. 17 illustrates a modification example of a relationship table. In a definition table 250 illustrated in FIG. 16, a control code D1 is a code for giving an instruction for clean installation for this product (a product to which attention is presently given), and is a code for giving an instruction for a notice of the deletion of the product and the setting information thereof. Here, the product is a product associated with the product on the relationship table 251. A control code D2 is a code for giving an instruction for overwrite installation with respect to the product, and is a code for giving an instruction for a notice of the deletion of the product and the succession of the setting information thereof. A control code D3 is a code for giving an instruction for prohibiting the installation of the product in a case where the product has been installed, and is a code for giving an instruction for a notice of impossibility of installation of the product.

For example, the relationship table 251 as illustrated in FIG. 17 is constructed with contents of the definition table as a premise. The relationship table 251 is constituted by plural records corresponding to plural products (this product). Each of the records includes this product, a product name, and a combination of a control code and the product having the control code applied thereto. For example, with respect to a product XXX-B, the control code D1 is applied to a product XXX-A. That is, clean installation of the product XXX-B is executed (notice information is displayed prior to the execution). In addition, with respect to the product XXX-B, the control code D3 is applied to the product XXX-A. That is, in a case where the product XXX-B has been installed, the installation of the product XXX-A is prohibited (a notice of impossibility of installation is given prior to the prohibition).

The relationship table 251 is also different from the relationship table illustrated in FIG. 8 in that contents of installation control and contents of display control are written for each combination of a target product and a to-be-replaced product.

Figure 19:
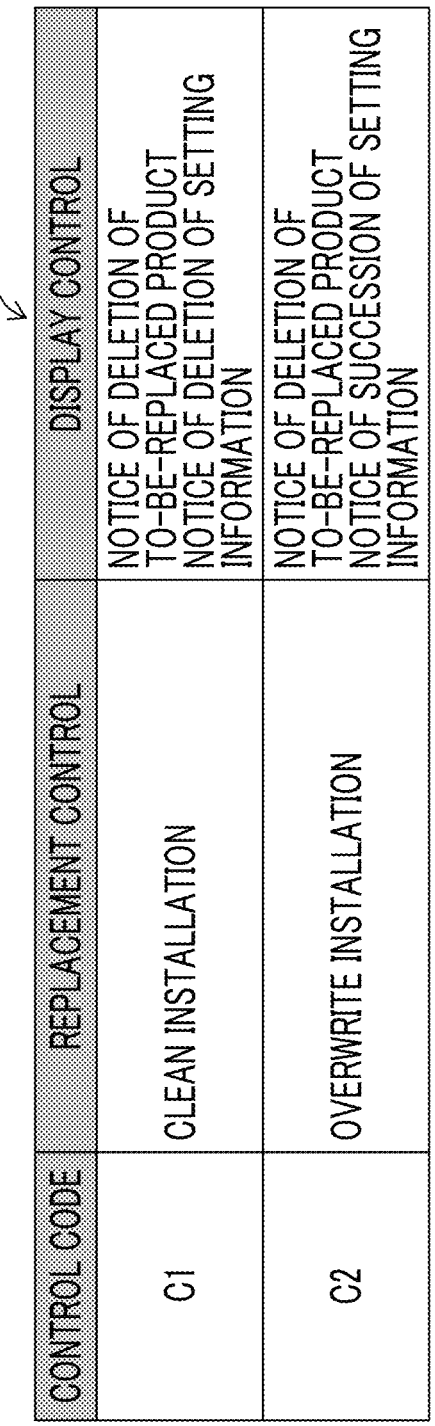
FIG. 19 is a diagram illustrating a configuration example of an installation type definition table in the second exemplary embodiment.

A second exemplary embodiment will be described with reference to FIGS. 18 to 21. A system configuration according to the second exemplary embodiment is the same as that illustrated in FIG. 1. The same is true of a third exemplary embodiment to be described later. In the second exemplary embodiment, a replacement type definition table 252 illustrated in FIG. 18 and an installation type definition table 253 illustrated in FIG. 19 are used.

On the replacement type definition table 252, plural replacement types T1, T2, T3, and T4 are defined. Specifically, the replacement type T1 is replacement of an experience version with a product version, the replacement type T2 is replacement of a free version with an upgrade version, the replacement type T3 is replacement of an individual product with a package product including the individual product, and the replacement type T4 is replacement of a provision-terminated product with a product subsequent to the provision-terminated product. It is possible to provide notice information suitable for the replacement type to the user by defining the replacement type. It is possible to change contents of installation control in accordance with the replacement type.

On the installation type definition table 253, plural installation types are defined. Specifically, an installation type (control code) C1 is clean installation, and an installation type (control code) C2 is overwrite installation. In this manner, it is possible to perform installation control and display control which are suitable for the installation types by defining the installation types.

FIG. 20 illustrates a relationship table. In a relationship table 254 illustrated in the drawing, a record is generated for each target product, and each of the record includes a code of the target product, a product name, a code of a to-be-replaced product, and a replacement type, and a control code. In a case where a target product is specified, a to-be-replaced product is specified in accordance with the relationship table 254, and a replacement type and a control code are specified. In addition, installation control and display control are executed in accordance with the replacement type and the control code.

The above-described replacement type definition table, installation type definition table, and relationship table are managed in the information management server, and the tables are provided to the software management device in accordance with a request given from the software management device. Naturally, the tables may be held or managed from the beginning in the software management device.

In the second exemplary embodiment, installation control is executed in accordance with an installation type (control code). That is, in a case where a to-be-replaced product associated with a target product is present within a target device, clean installation or overwrite installation is executed in accordance with a designated installation type. NOTICE information is displayed prior to the execution. The contents thereof are arranged in FIG. 21.

As illustrated in FIG. 21, in the second exemplary embodiment, contents of notice information are changed in accordance with a combination of a replacement type (replacement type) and an installation type (control code). For example, in a case of the replacement type T1, a product type name of "product version" is included in a message even in a case where any one of the control codes C1 and C2 is designated. Meanwhile, "A" is the name of a to-be-replaced product, and "B" is the name of a target product. In a case of the replacement type T2, a general message as illustrated in FIG. 11 or 12 is displayed. In a case of the replacement type T3, it is clearly expressed that a to-be-replaced product is not displayed. In a case of the replacement type T3 and the control code C1 (clean installation), non-succession information is displayed. On the other hand, in a case of the replacement type T3 and the control code C2 (overwrite installation), succession information is not displayed in the example illustrated in the drawing. Naturally, the succession information may be displayed in the case. In the replacement type T4, a product type name of "subsequent product" is included in a message.

In this manner, in a case where contents of notice information are changed in accordance with the replacement type, the user can more easily recognize a replacement relationship and a state after installation.

Figure 22:
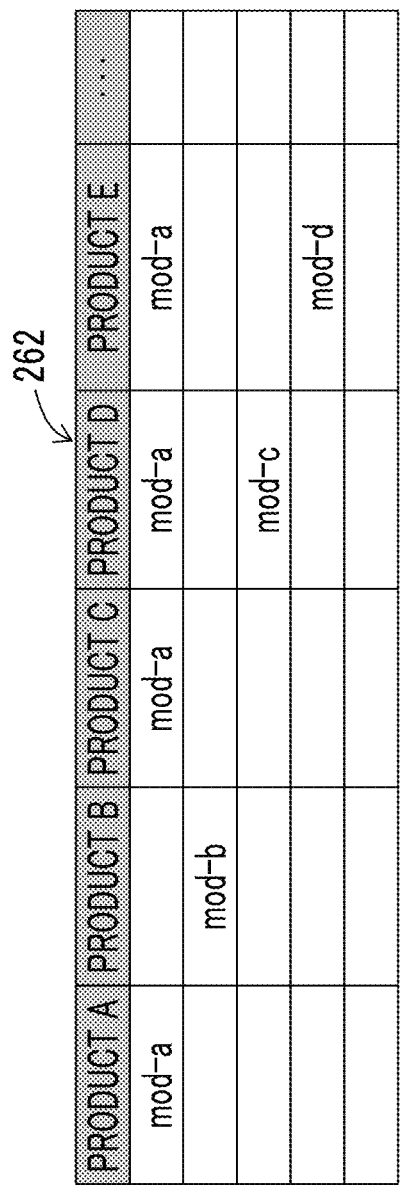
FIG. 22 is a diagram illustrating a configuration example of a relationship table in a third exemplary embodiment.

Next, the third exemplary embodiment will be described with reference to FIGS. 22 and 23. In FIG. 22, a relationship table is illustrated. In a relationship table 262, a module configuration is managed for each product. That is, one or plural modules constituting each product are arranged for each product. A to-be-replaced product corresponding to a target product is specified on the basis of contents of the relationship table 262, that is, a relationship between the module configurations, and installation control contents and display control contents are determined. Meanwhile, in the relationship table 262, a product shown on the right side is newer than a product shown on the left side.

In FIG. 23, contents of control in the third exemplary embodiment are illustrated. In case 1 and case 2, an installed product having the same module as the module included in the target product is not present within a target device, a to-be-replaced product is not specified in the cases, and normal installation control is executed. In a case where product replacement is desired to be performed in the case 1 and case 2, the configuration in the first exemplary embodiment or the second exemplary embodiment may be partially adopted.

In case 3, a module a is used in common between a target product C and an installed product A, and the target product C is a newer product. In this case, it is determined that the product A is a to-be-replaced product, and overwrite installation of the target product C is performed. Specifically, a module of the product C is overwritten on a module a of the product A. This is generally based on the fact that a newer product includes a newer module in many cases. In a case where a module version is managed with respect to each of the modules, module versions may be compared with each other to determine whether or not overwrite is necessary. In addition, the dates and times of release of products may be compared with each other to determine whether or not overwrite is necessary.

In case 4, the target product D and the installed product A include the same module a. In this case, overwrite is performed by the module a of the target product D, and a module c of the target product D is additionally installed. In case 5, it is determined that the product D is a to-be-replaced product from a relationship between a module configuration of a target product E and a module configuration of the installed product D, overwrite is performed by the module a of the target product E, a module c of the target product D is deleted, and a module d of the target product E is additionally installed. However, in the cases, it may be determined that the installed product D is not a to-be-replaced product. Alternatively, module configurations of two products may be presented to the user to charge the user with selection regarding whether to perform replacement.

According to the third exemplary embodiment, even in a case where a replacement relationship has not been registered or managed in advance, it is possible to estimate a combination of a target product and a to-be-replaced product from a relationship between module configurations. In order to correctly specify a combination of a target product and a replaced product, the first exemplary embodiment or the second exemplary embodiment may be adopted, or the configuration of the first exemplary embodiment or the second exemplary embodiment may be adopted partially or in a complementary manner in the third exemplary embodiment.

Figure 24:
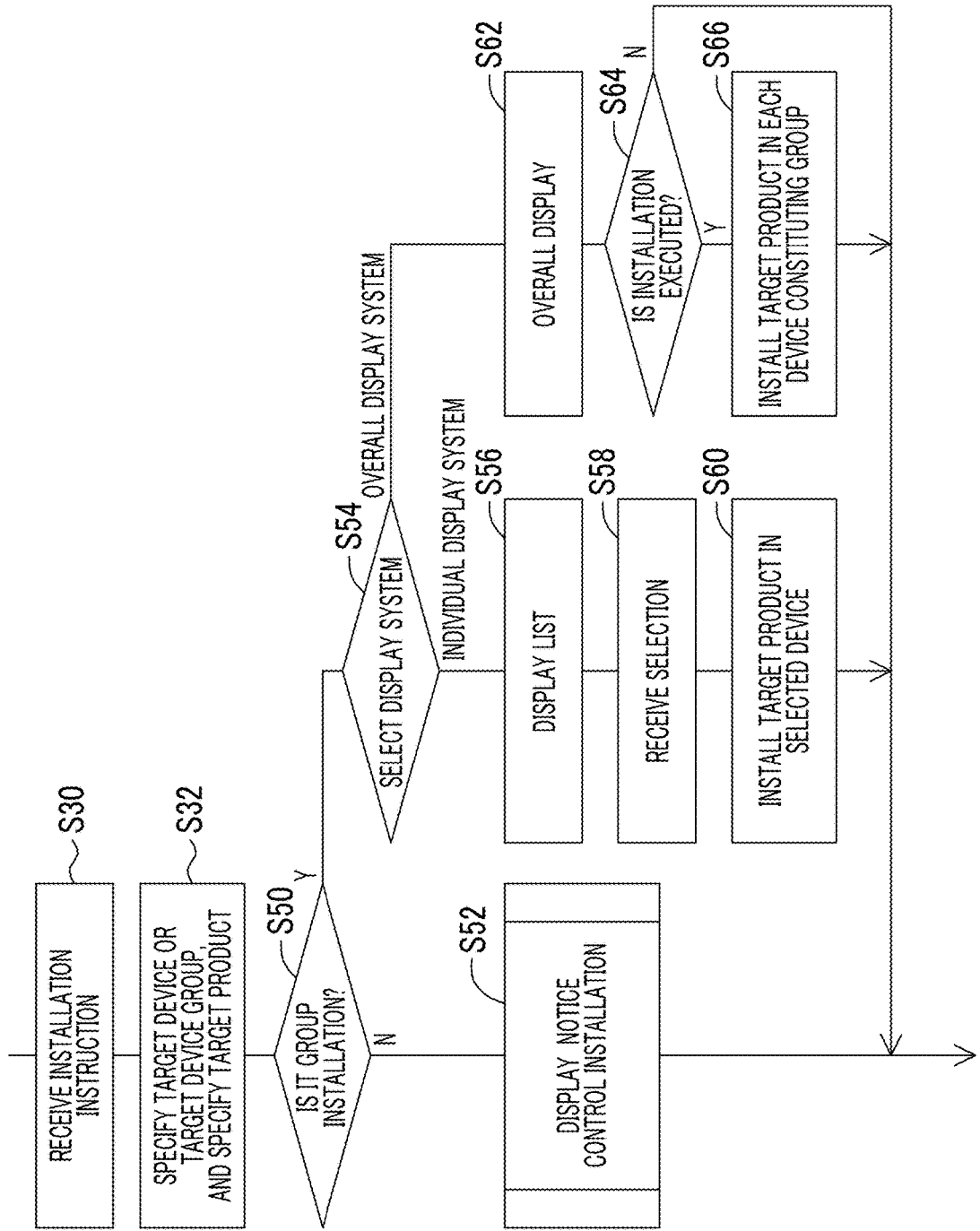
FIG. 24 is a flowchart illustrating an operation example in a case where remote installation is performed on a device group.

The remote installation of a target product for a device group will be described with reference to FIGS. 24 to 26. A flowchart illustrated in FIG. 24 shows an operation example of the software management device. In the flowchart, the same steps as the steps illustrated in FIG. 15 will be denoted by the same reference numerals.

In S30, an installation operation by the user of the software management device is received. In S32, a target device or a target device group which is an installation destination is specified, and a target product is specified. The target device group is a device set constituted by plural devices to be subjected to a collective operation. In S50, single installation in a target device or multi-installation (group installation) in a target device group is determined. In a case of normal installation, S34 and the subsequent steps illustrated in FIG. 15 are executed in S52.

In a case where the multi-installation is determined in S50, a display system is selected in S54. In this case, a preset display system may be automatically selected. Alternatively, a display system may be selected by the user. In S54, in a case where an individual display system is selected, a list of the names of plural devices constituting a device group is displayed as installation candidates in S56. Specifically, in S56, it is determined whether or not a device having a to-be-replaced product is present in the device group. In a case where a device having a to-be-replaced product is present in the device group, the device is specified, and notice information is displayed for the device, similar to the above-described exemplary embodiments. The specific example thereof will be described later with reference to FIG. 25. In S58, the real installation destination is confirmed or selected by the user, from the list of the plural devices displayed. In S60, a target product is installed in the installation destination which is confirmed or selected by the user.

On the other hand, in S54, in a case where an overall display system is selected, a screen for requiring an input for checking whether or not collective installation in the plural devices constituting the device group can be performed is displayed in S62. Specifically, in S62, it is determined whether or not a device having a to-be-replaced product is present in the device group, that is, a device having a to-be-replaced product is specified. In a case where a device having a to-be-replaced product is included, notice information is displayed similar to the above-described exemplary embodiments. In this case, the notice information may be displayed while clearly expressing one or plural devices having a to-be-replaced product. The specific example thereof will be described below with reference to FIG. 26.

Display contents in the overall display system are simpler than display contents in the above-described list display system, but a section for individually selecting installation destinations is not displayed. In S64, an instruction for executing installation by the user is received, and multi-installation of a target product for which plural devices constituting a designated device group are set to be installation destinations is executed in S66.

In any display system, it is determined whether or not a to-be-replaced product is present for each device. In a case where a to-be-replaced product is not present, normal installation for the target product is executed. On the other hand, in a case where a to-be-replaced product is present, replacement type installation for the target product is executed.

In the above-described operation example, it is possible to select a display system in a case where multi-installation for a device group is required. For example, the list display system is selected in a case where installation destinations are individually confirmed or selected before multi-installation, and the overall display system is selected in a case where, for example, simple display and operation are required from a situation such as the presence of a large number of installation destinations. A display system in which compromise is made between both the display systems may be adopted.

Figure 25:
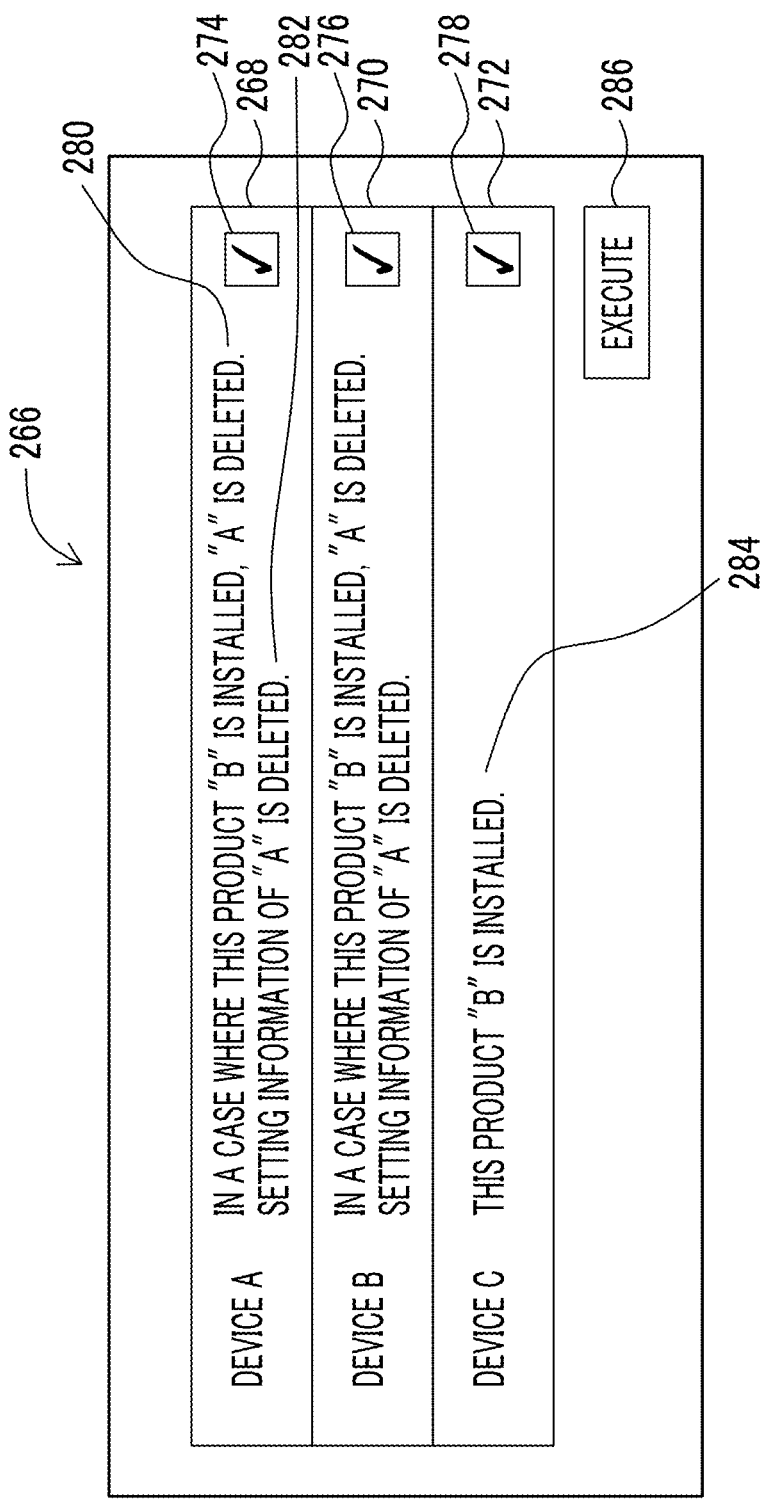
FIG. 25 is a diagram illustrating an example of group notice information constituted by plural pieces of notice information.

FIG. 25 illustrates a screen 266 displayed in a case where the list display system is selected. The screen 266 includes plural items 268, 270, and 272 arranged in the vertical direction. The plural items 268, 270, and 272 correspond to devices A, B, and C constituting a device group. The items 268, 270, and 272 include check boxes 274, 276, and 278, respectively. For example, in a default state, a check mark is written in each of the check boxes 274, 276, and 278, and any check can be removed by the user's click operation. The device for which the check mark is written serves as an installation destination for a target product.

The items 268 and 270 include replacement notice information 280 and non-succession notice information as notice information. That is, notice of the execution of clean installation with respect to the devices A and B is given. That is, the devices A and B are devices having a to-be-replaced product. On the other hand, the item 284 includes only a message for giving a notice of installation. That is, the device C is a device that does not have a to-be-replaced product, notice of the execution of normal installation with respect to the device C is given. The installation of a target product in a device which is confirmed or selected by the user is executed by operating an execution button 286.

A device list constituted by plural device names is present over the plural items 268, 270, and 272, and a notice information list constituted by plural pieces of notice information is configured in the example illustrated in the drawing. The notice information list is constituted by pieces of notice information corresponding to the number of devices having a to-be-replaced product. Contents may be different from each of the plural pieces of notice information. For example, a notice information list including notice information for giving a notice of clean installation and notice information for giving a notice of overwrite installation may be displayed on the basis of the contents of the relationship table.

According to the display example illustrated in FIG. 25, it is possible to make the user recognize a state for each device after multi-installation, prior to the multi-installation. Accordingly, it is possible to previously prevent a certain software product from suddenly disappearing in a certain device, in the user's recognition.

FIG. 26 illustrates a screen 290 displayed in a case where the overall display system is selected. In the example illustrated in the drawing, devices having a to-be-replaced product are devices A and B, and a device that does not have a to-be-replaced product is a device C. The names of the devices constitute a device list (see reference numerals 292 and 298). Reference numeral 294 denotes replacement notice information, and reference numeral 296 denotes non-succession notice information. The pieces of information constitute notice information. The illustrated pieces of notice information are notice information corresponding to clean installation. Naturally, notice information corresponding overwrite installation may be displayed. It is, for example, preferable that notice information is displayed for each installation type. Reference numeral 300 denotes a message indicating that normal installation is performed. A button 302 is operated in a case where collective installation of target product with respect to a device group is performed, and a button 304 is operated in a case where collective installation is not performed.

According to the display example illustrated in FIG. 26, individual selection of installation destinations cannot be performed, but it is possible to make the user recognize a state for each device after multi-installation, prior to the multi-installation. Accordingly, it is possible to previously prevent a certain software product from suddenly disappearing in a certain device, in the user's recognition.

8. Arrangement of Disclosed Matters

This application discloses a software management device that includes a specification section and a providing section. An example of the specification section is the installation control unit in the exemplary embodiment, and an example of the providing section is a notice information generation unit in the exemplary embodiment.

The specification section is a section that specifies a to-be-replaced product which is a software product having been installed in a device in advance and which is replaced with a target product, prior to remote installation of the target product in the device. The providing section is a section that provides notice information, including replacement notice information for giving a notice of the replacement of the to-be-replaced product with the target product, to the user who attempts to execute the remote installation, prior to the remote installation. According to this configuration, the notice information, particularly, the replacement notice information is provided to the user prior to the remote installation, and thus it is possible to make the user recognize a situation occurring by the remote installation in advance.

The device is, for example, an image forming device. The software management device is a device that manages or controls the remote installation of a product in a device such as an image forming device, instead of the installation of a product in the software management device. In this meaning, the installation is different from general installation. A to-be-replaced product corresponding to a target product is specified by referring to, for example, a relationship table. On a relationship table, a relationship between a target product and a to-be-replaced product may be directly written, and a module configuration for indirectly specifying the relationship, and the like may be written. The notice information may be constituted as a display element such as a message or a mark. The notice information or a post notification may be provided to a user of each device instead of the user of the software management device.

The above-described relationship table is provided, for example, from the information management server to the software management device. In this case, another information (for example, definition information) which is required in remote installation control may be provided from the information management server to the software management device. The relationship table and the like may be individually held and managed in the individual software management device. The specification of a to-be-replaced product corresponding to a target product is facilitated or enabled by using a management table. The new registration and correction of a replacement relationship are also facilitated.

In the relationship table, an installation type may be registered for each combination of a target product and a to-be-replaced product. According to such a configuration, it is possible to rapidly determine a specific installation type with reference to the relationship table, and to change contents of notice information in accordance with the installation type. Examples of the installation type include clean installation and overwrite installation. These differ at least in whether or not the succession of setting information has been performed. Another installation type may be adopted. In the exemplary embodiment, succession notice information is displayed in a case of overwrite installation, and non-succession notice information is displayed in a case of clean installation. Only one of the succession notice information and the non-succession notice information may be displayed.

On the relationship table, a replacement type may be managed for each combination of a target product and a to-be-replaced product. According to such a configuration, contents of the notice information can be changed in accordance with the replacement type, and thus it is possible to provide more precise replacement information to the user.

In the exemplary embodiment, the software management device has a function of performing multi-installation (group installation) as remote installation of a target product in a device group. In a case where the function is executed, the specification section specifies a to-be-replaced software product for each device, prior to the remote installation of a target software product in plural devices constituting the device group. Then, the providing section provides group replacement notice information for giving a notice of the replacement of each of one or plural to-be-replaced products, which have been installed in plural devices in advance, with a target product to the user as replacement notice information. The group replacement notice information may be configured as a set of plural pieces of replacement notice information. The group replacement notice information may be configured as single replacement notice information.

In the exemplary embodiment, the software management system including the software management device is configured. A program for software management may be installed in an information processing device through a portable storage medium or a network.

In the exemplary embodiment, the information management server is connected to an external network, but the information management server may be connected to the same internal network together with the software management device. Alternatively, it is also considered that the software management device and the information management server are integrated with each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A software management device comprising:
   a hardware processor, configured to:
   specify a to-be-replaced software product which is a software product having been installed in a device in advance and which is replaced with a target software product, prior to remote installation of the target software product in the device;
   in response to an instruction of the remote installation of the target software product being received from a user, provide notice information including replacement notice information for giving a notice that the to-be-replaced software product will be replaced by the target software product to the user, prior to the remote installation being executed;
   specify the to-be-replaced software product for each device, prior to remote installation of the target software product in a plurality of devices constituting a device group; and
   provide group replacement notice information for giving a notice of replacement of one or each of a plurality of to-be-replaced software products, which have been installed in the plurality of devices in advance, with the target software product to the user as the replacement notice information.

2. The software management device according to claim 1, wherein the hardware processor specifies the to-be-replaced software product corresponding to the target software product with reference to a relationship table showing relationships between a plurality of software products.

3. The software management device according to claim 2, wherein an installation type is registered for each combination of the target software product and the to-be-replaced software product in the relationship table, and wherein the hardware processor determines an installation type corresponding to the combination of the target software product and the to-be-replaced software product with reference to the relationship table, and changes contents of the notice information in accordance with the installation type.

4. The software management device according to claim 3, wherein in a case where the determined installation type is overwrite installation, the hardware processor includes succession notice information for giving a notice of succession of setting information in the notice information.

5. The software management device according to claim 3, wherein in a case where the determined installation type is clean installation, the hardware processor includes non-succession notice information for giving a notice of non-succession of setting information in the notice information.

6. The software management device according to claim 2, wherein a replacement type is registered for each combination of the target software product and the to-be-replaced software product in the relationship table, and
wherein the hardware processor changes contents of the notice information in accordance with the replacement type.

7. The software management device according to claim 6, wherein the replacement type includes at least one of replacement of a non-regular version with a regular version, replacement of a free version with a pay version, replacement of an individual product version with a product set version, or replacement of a supply termination version with a succession version.

8. The software management device according to claim 2, wherein a module configuration is registered for each software product in the relationship table, and
wherein the hardware processor specifies the to-be-replaced software product with reference to the relationship table.

9. The software management device according to claim 1, wherein the group replacement notice information is configured as single replacement notice information or a set of a plurality of pieces of replacement notice information corresponding to the one or a plurality of to-be-replaced software products.

10. The software management device according to claim 9, wherein the hardware processor is further configured to:
select one or a plurality of devices in which the target software product is actually installed, from among the plurality of devices.

11. The software management device according to claim 1,
wherein the group replacement notice information is configured as single replacement notice information corresponding to all of the plurality of devices having the to-be-replaced software product.

12. A software management system comprising:
a software management device which is connected to an image forming device and manages a software product which is installed or is to be installed in the image forming device; and
a server which is connected to the software management device and provides a relationship table showing a relationship between software products to the software management device,
wherein the software management device includes a hardware processor configured to:
specify a to-be-replaced software product which is a software product having been installed in the image forming device and which is replaced with a target software product, with reference to the relationship table, prior to remote installation of the target software product in the image forming device,
generate notice information for giving a notice that the to-be-replaced software product will be replaced by the target software product prior to the remote installation being executed, and changes contents of the notice information in accordance with a combination of the target software product and the to-be-replaced software product, and
in response to an instruction of the remote installation of the target software product being received from a user, provide the notice information to the user, prior to the remote installation being executed.

13. A non-transitory computer readable medium storing a program which is executed in an information processing device as a software management device, the program comprising:
a function of specifying a to-be-replaced software product which is a software product having been installed in a device in advance and which is replaced with a target software product, prior to remote installation of the target software product in the device; and
a function of, in response to an instruction of the remote installation of the target software product being received from a user, providing notice information including replacement notice information for giving a notice that the to-be-replaced software product will be replaced by the target software product to the user, prior to the remote installation being executed;
a function of, specifying the to-be-replaced software product for each device, prior to remote installation of the target software product in a plurality of devices constituting a device group; and
a function of, providing group replacement notice information for giving a notice of replacement of one or each of a plurality of to-be-replaced software products, which have been installed in the plurality of devices in advance, with the target software product to the user as the replacement notice information.

14. A non-transitory computer readable medium storing a program which is executed in an information processing device as a software management device, the program comprising:
a function of specifying a to-be-replaced software product which is a software product having been installed in a device in advance and which is replaced with a target software product, prior to remote installation of the target software product in the device, wherein the to-be-replaced software product corresponding to the target software product is specified with reference to a relationship table showing relationships between a plurality of software products; and
a function of, in response to an instruction of the remote installation of the target software product being received from a user, providing notice information including replacement notice information for giving a notice that the to-be-replaced software product will be replaced by the target software product to the user, prior to the remote installation being executed.

* * * * *